(12) United States Patent
Takagishi et al.

(10) Patent No.: US 10,943,607 B2
(45) Date of Patent: Mar. 9, 2021

(54) MAGNETIC RECORDING DEVICE SUPPLIED WITH VARYING RECORDING CURRENT

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Masayuki Takagishi, Tokyo (JP); Naoyuki Narita, Chiba (JP); Tomoyuki Maeda, Kanagawa (JP)

(73) Assignees: KABUSHIKI KAISHA TOSHIBA, Tokyo (JP); TOSHIBA ELECTRONIC DEVICES & STORAGE CORPORAION, Tokyo (JP)

( * ) Notice: Subject to any disclaimer, the term of this patent is extended or adjusted under 35 U.S.C. 154(b) by 0 days.

(21) Appl. No.: 16/351,010

(22) Filed: Mar. 12, 2019

(65) Prior Publication Data
US 2020/0090685 A1    Mar. 19, 2020

(30) Foreign Application Priority Data
Sep. 18, 2018   (JP) .............................. JP2018-174140

(51) Int. Cl.
*G11B 5/02*        (2006.01)
*G11B 5/09*        (2006.01)
(Continued)

(52) U.S. Cl.
CPC .................. *G11B 5/02* (2013.01); *G11B 5/09* (2013.01); *G11B 5/11* (2013.01); *G11B 5/1278* (2013.01);
(Continued)

(58) Field of Classification Search
None
See application file for complete search history.

(56) References Cited

U.S. PATENT DOCUMENTS 8,107,352 B1    1/2012   Yamanaka et al.
8,953,273 B1    2/2015   Funayama
2017/0148471 A1*  5/2017  Tabata et al. ........ G11B 5/3153

FOREIGN PATENT DOCUMENTS

CN           105206286 A       12/2015

OTHER PUBLICATIONS

Zhu et al., "Microwave Assisted Magnetic Recording Utilizing Perpendicular Spin Torque Oscillator With Switchable Perpendicular Electrodes," IEEE Transactions on Magnetics, vol. 46, No. 3, pp. 751-757 (2010).

* cited by examiner

*Primary Examiner* — Craig A. Renner
(74) *Attorney, Agent, or Firm* — Finnegan, Henderson, Farabow, Garrett & Dunner, L.L.P.

(57) ABSTRACT

According to one embodiment, a magnetic recording device includes a magnetic head, a first electrical circuit, and a second electrical circuit. The magnetic head includes a magnetic pole, a first shield, a conductive member electrically connecting the magnetic pole and the first shield and being provided between the magnetic pole and the first shield, and a coil. The first electrical circuit is configured to supply a first current to the magnetic pole, the conductive member, and the first shield. The second electrical circuit is configured to supply a recording current to the coil. A recording magnetic field is generated from the magnetic pole. The recording magnetic field corresponds to the recording current. A rise time of the recording current is not less than 65% of a shortest bit length.

12 Claims, 15 Drawing Sheets

(51) Int. Cl.
    *G11B 5/31*           (2006.01)
    *G11B 5/11*           (2006.01)
    *G11B 5/235*         (2006.01)
    *G11B 5/127*         (2006.01)
    *G11B 5/66*           (2006.01)
    *G11B 5/00*           (2006.01)

(52) U.S. Cl.
    CPC .............. *G11B 5/235* (2013.01); *G11B 5/314* (2013.01); *G11B 5/315* (2013.01); *G11B 5/3146* (2013.01); *G11B 5/66* (2013.01); *G11B 2005/0024* (2013.01)

MAGNETIC RECORDING DEVICE SUPPLIED WITH VARYING RECORDING CURRENT

CROSS-REFERENCE TO RELATED APPLICATIONS

This application is based upon and claims the benefit of priority from Japanese Patent Application No. 2018-174140, filed on Sep. 18, 2018; the entire contents of which are incorporated herein by reference.

FIELD

Embodiments described herein relate generally to a magnetic recording device.

BACKGROUND

Information is recorded in a magnetic storage medium such as a HDD (Hard Disk Drive) or the like using a magnetic head. It is desirable to increase the recording density of the magnetic head and the magnetic recording device.

DETAILED DESCRIPTION

Figure 1A:
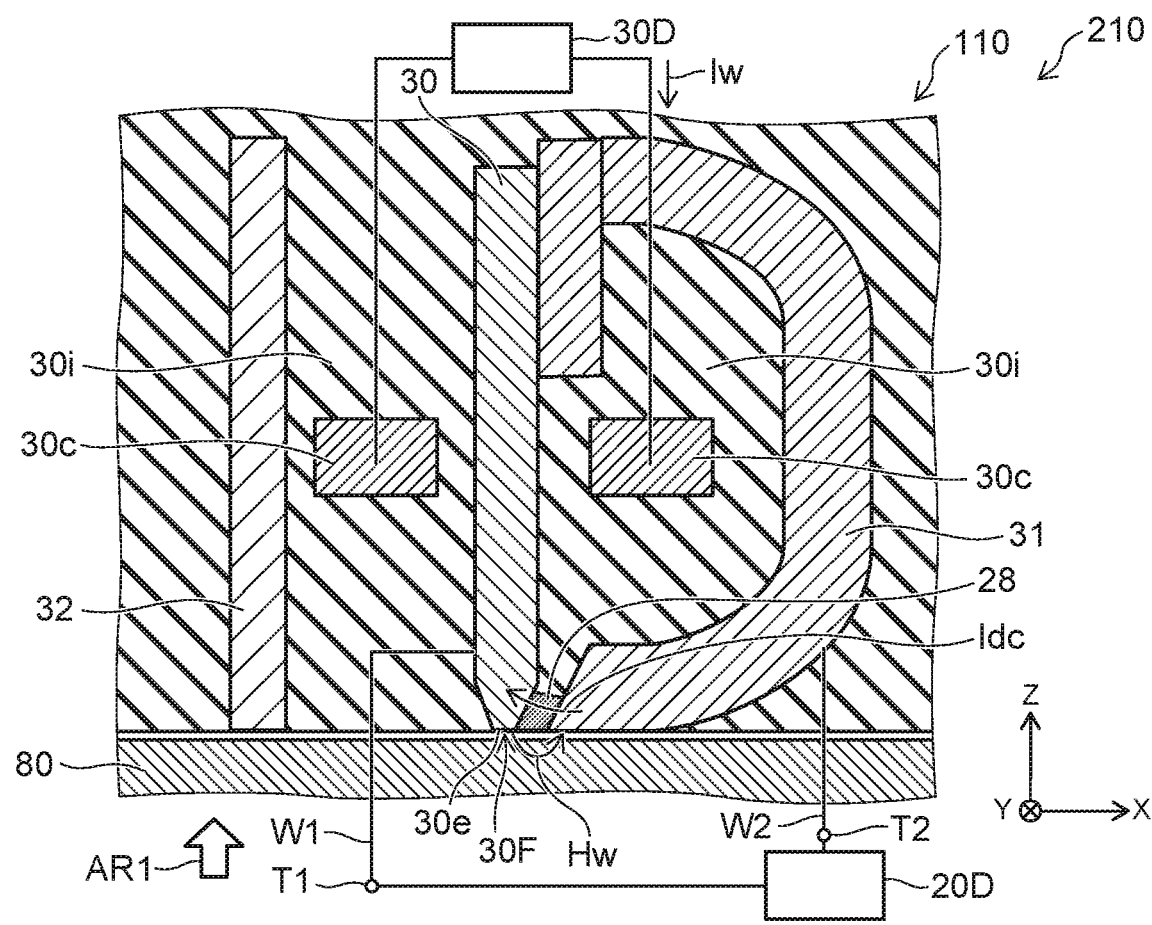
FIG. 1A and FIG. 1B are schematic views illustrating a magnetic recording device according to a first embodiment.

According to one embodiment, a magnetic recording device includes a magnetic head, a first electrical circuit, and a second electrical circuit. The magnetic head includes a magnetic pole, a first shield, a conductive member electrically connecting the magnetic pole and the first shield and being provided between the magnetic pole and the first shield, and a coil. The first electrical circuit is configured to supply a first current to the magnetic pole, the conductive member, and the first shield. The second electrical circuit is configured to supply a recording current to the coil. A recording magnetic field is generated from the magnetic pole. The recording magnetic field corresponds to the recording current. A rise time of the recording current is not less than 65% of a shortest bit length.

According to another embodiment, a magnetic recording device includes a magnetic head, a first electrical circuit, and a second electrical circuit. The magnetic head includes a magnetic pole, a first shield, a conductive member electrically connecting the magnetic pole and the first shield and being provided between the magnetic pole and the first shield, and a coil. The first electrical circuit is configured to perform at least a first operation and a second operation. The first operation supplies a first current to the magnetic pole, the conductive member, and the first shield. The second operation does not supply the first current to the magnetic pole, the conductive member, and the first shield. The second electrical circuit is configured to supply a recording current to the coil. A recording magnetic field is generated from the magnetic pole. The recording magnetic field corresponds to the recording current.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
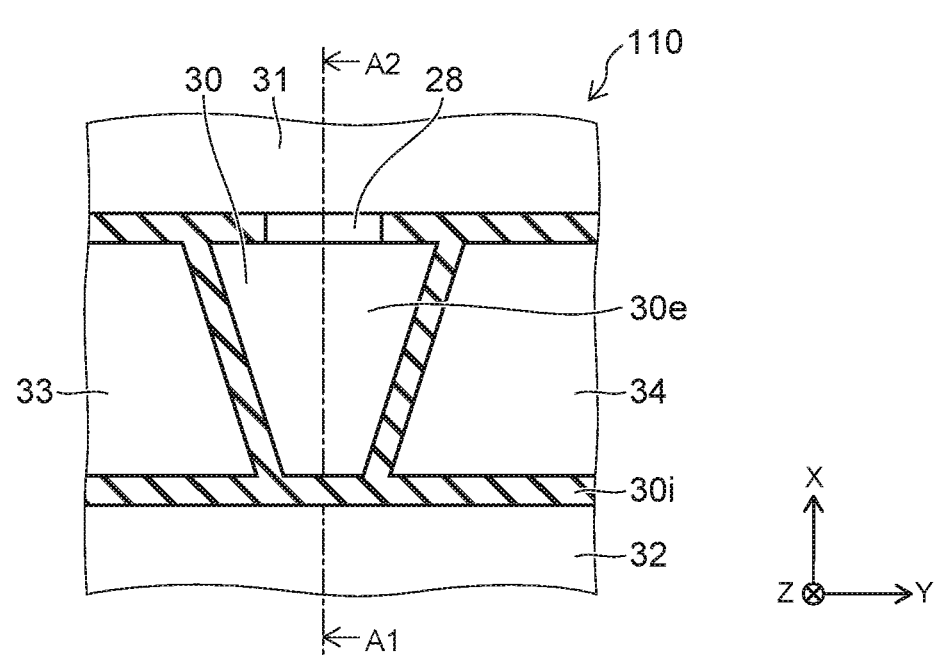

FIG. 1A and FIG. 1B are schematic views illustrating a magnetic recording device according to a first embodiment.

FIG. 1A is a line A1-A2 cross-sectional view of FIG. 1B. FIG. 1B is a plan view viewed along arrow AR1 of FIG. 1A. A magnetic recording medium 80 is illustrated in FIG. 1A but not illustrated in FIG. 1B.

As shown in FIG. 1A, the magnetic recording device 210 according to the embodiment includes a magnetic head 110 and a first electrical circuit 20D. The magnetic head 110 includes a magnetic pole 30, a first shield 31, and a conductive member 28. In the example, the magnetic head 110 further includes a second shield 32 and a coil 30c.

The magnetic pole 30 is provided between the first shield 31 and the second shield 32. At least a portion of the coil 30c is provided between the magnetic pole 30 and the first shield 31. In the example, a portion of the coil 30c is provided between the magnetic pole 30 and the second shield 32.

A second electrical circuit 30D is electrically connected to the coil 30c. The second electrical circuit 30D is, for example, a recording electrical circuit. A recording current Iw is supplied from the second electrical circuit 30D to the coil 30c. A magnetic field (a recording magnetic field Hw) that corresponds to the recording current Iw is generated from the magnetic pole 30. The recording magnetic field Hw is applied to the magnetic recording medium 80; and information is recorded in the magnetic recording medium 80. Thus, the second electrical circuit 30D is configured to supply, to the coil 30c, the recording current Iw corresponding to the information to be recorded.

The conductive member 28 is provided between the magnetic pole 30 and the first shield 31. The conductive member 28 contacts the magnetic pole 30 and the first shield 31.

The conductive member 28 is nonmagnetic.

The conductive member 28 includes, for example, at least one of Cu, Au, Ag, Al, Ir, Ta, Ru, Pt, W, or Mo.

An insulating portion 30i is provided around the magnetic pole 30, the first shield 31, the second shield 32, the coil 30c, and the conductive member 28.

An end portion 30e of the magnetic pole 30 opposes the magnetic recording medium 80. The end portion 30e has a first surface 30F. For example, the first surface 30F corresponds to a medium-opposing surface. The first surface 30F is aligned with the ABS (Air Bearing Surface) of the magnetic head 110. The first surface 30F opposes the magnetic recording medium 80.

A direction perpendicular to the first surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is, for example, the cross-track direction.

The first shield 31 is separated from the magnetic pole 30 along the X-axis direction. The X-axis direction is aligned with the first surface 30F. For example, the first shield 31 is separated from the magnetic pole 30 along the X-axis direction at the vicinity of the first surface 30F. For example, the magnetic pole 30 is separated from the second shield 32 along the X-axis direction at the vicinity of the first surface 30F. The magnetic head 110 and the magnetic recording medium 80 move relatively substantially along the X-axis direction. Thereby, the information is recorded at any position of the magnetic recording medium 80.

The magnetic pole 30 is, for example, a major magnetic pole. The first shield 31 is, for example, an auxiliary magnetic pole. The first shield 31 can form a magnetic core with the magnetic pole 30.

Side shields (a third shield 33 and a fourth shield 34) may be provided as shown in FIG. 1B. The magnetic pole 30 is provided between the third shield 33 and the fourth shield 34 in the Y-axis direction.

The gap between the end portion 30e of the magnetic pole 30 and the end portion of the first shield 31 corresponds to a recording gap. The conductive member 28 is provided in the recording gap.

The first electrical circuit 20D is configured to supply a direct current Idc to the magnetic pole 30, the conductive member 28, and the first shield 31.

For example, a first interconnect W1 and a second interconnect W2 are provided. The first interconnect W1 is electrically connected to the magnetic pole 30. The second interconnect W2 is electrically connected to the first shield 31. A first terminal T1 and a second terminal T2 may be provided. The first terminal T1 is electrically connected to the magnetic pole 30 via the first interconnect W1. The second terminal T2 is electrically connected to the first shield 31 via the second interconnect W2.

The direct current Idc recited above is supplied from the first electrical circuit 20D. The direct current Idc flows in the magnetic pole 30, the conductive member 28, and the first shield 31 via the first terminal T1, the first interconnect W1, the second interconnect W2, and the second terminal T2.

In one example, the orientation of the direct current Idc is the orientation from the first shield 31 toward the magnetic pole 30. The orientation of the direct current Idc may be the orientation from the magnetic pole 30 toward the first shield 31. The orientation of the direct current Idc is arbitrary.

As described below, it was found that the recording magnetic field Hw is stabilized easily by the direct current Idc flowing. For example, the fluctuation of the recording magnetic field Hw can be suppressed. Thereby, a magnetic recording device can be provided in which the recording density can be increased.

Investigation results performed independently by the inventor will now be described.

Figure 2:
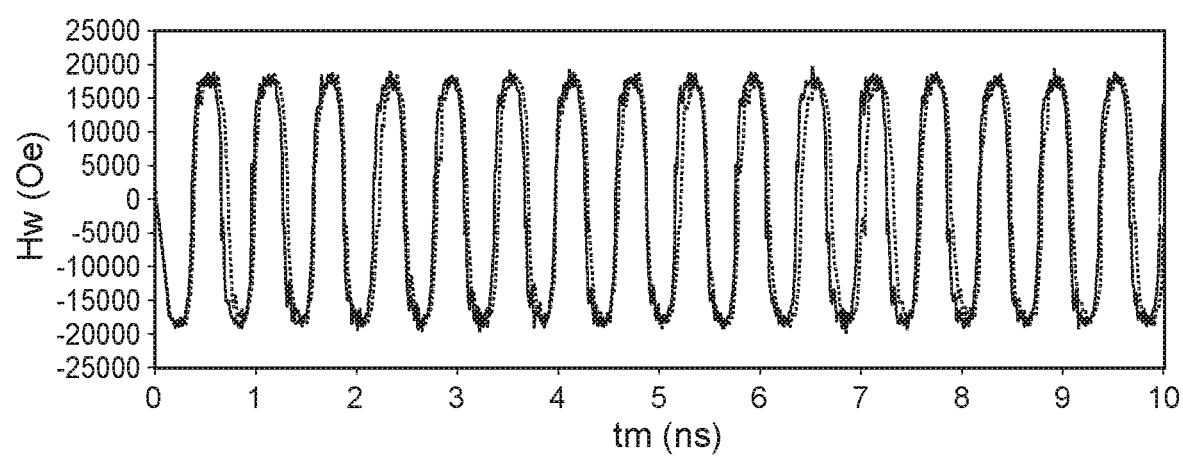
FIG. 2 is a graph illustrating a characteristic of the magnetic recording device.

FIG. 2 is a graph illustrating a characteristic of the magnetic recording device.

FIG. 2 illustrates simulation results of the recording magnetic field Hw generated from the magnetic pole 30 when the recording current Iw flows in the coil 30c. The polarity of the recording current Iw changes alternately. The recording current Iw corresponds to the case where the information of "0" and "1" is recorded alternately in the magnetic recording medium 80. The horizontal axis of FIG. 2 corresponds to a time tm (ns). The vertical axis of FIG. 2 corresponds to the recording magnetic field Hw (Oe).

In FIG. 2, the recording magnetic field Hw when the direct current Idc flows (the ON-state "ON") is illustrated by solid lines. In FIG. 2, the recording magnetic field Hw when the direct current Idc does not flow (the OFF-state "OFF") is illustrated by dotted lines.

As shown in FIG. 2, the recording magnetic field Hw when the direct current Idc is supplied (the solid lines) is different from the recording magnetic field Hw when the direct current Idc is not supplied (the dotted lines).

Figure 3A:
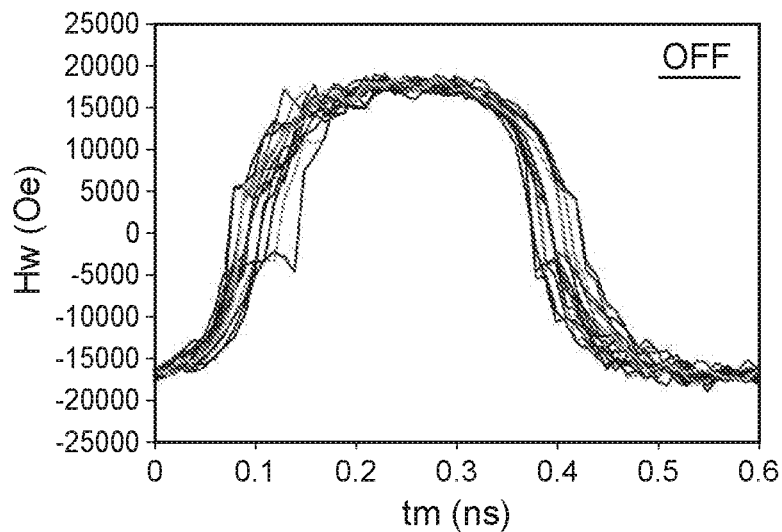
FIG. 3A to FIG. 3C are graphs illustrating the characteristic of the magnetic recording device.
Figure 3B:
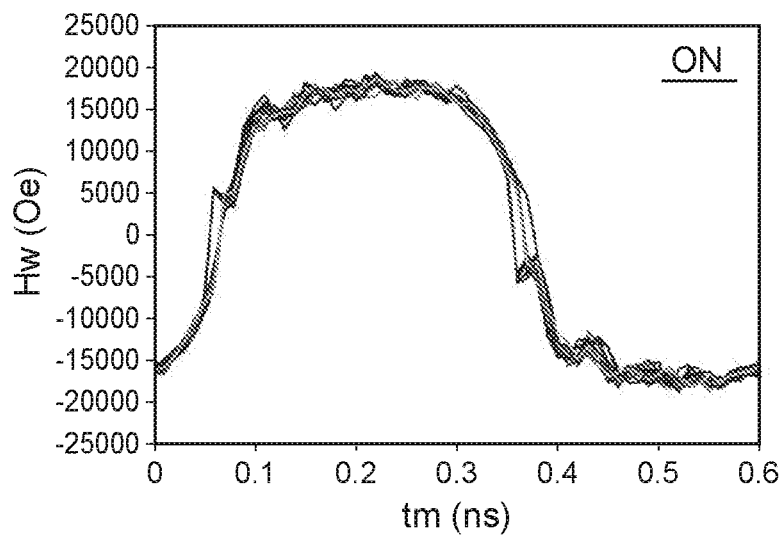
Figure 3C:
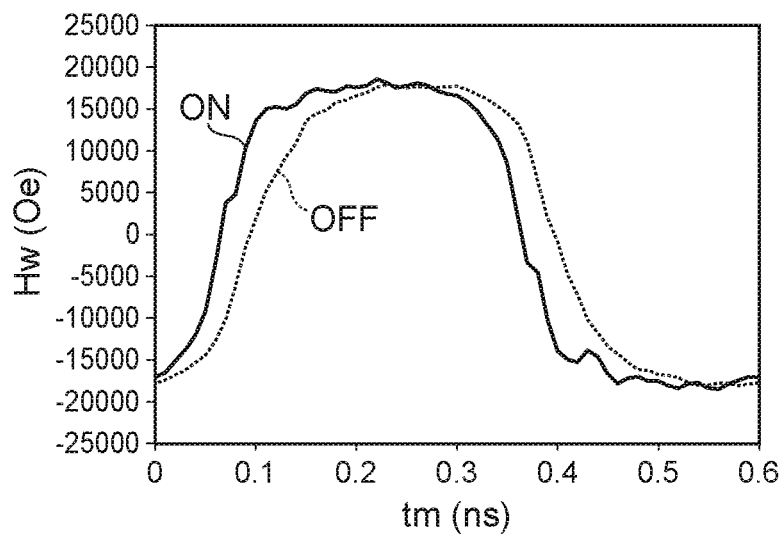

FIG. 3A to FIG. 3C are graphs illustrating the characteristic of the magnetic recording device.

In FIG. 3A, the recording magnetic field Hw of the dotted lines illustrated in FIG. 2 (the OFF-state "OFF") is shown overlaid. In FIG. 3B, the recording magnetic field Hw of the solid lines illustrated in FIG. 2 (the ON-state "ON") is shown overlaid. In FIG. 3C, the average characteristic of the recording magnetic field Hw of the OFF-state "OFF" illustrated in FIG. 3A is shown by a dotted line. In FIG. 3C, the average characteristic of the recording magnetic field Hw of the ON-state "ON" illustrated in FIG. 3B is shown by a solid line. In these figures, the horizontal axis corresponds to the time tm. In these figures, the vertical axis corresponds to the recording magnetic field Hw.

As shown in FIG. 3A, the fluctuation is large for the recording magnetic field Hw when the direct current Idc is not supplied. A large jitter occurs.

Conversely, as shown in FIG. 3B, the fluctuation is extremely small for the recording magnetic field Hw when the direct current Idc is supplied. The jitter is suppressed.

By reducing the fluctuation, for example, the on-track performance can be improved. For example, the on-track recording density can be increased.

It is considered that when the direct current Idc is not supplied, for example, complex magnetic domains are formed at the tip portion of the magnetic pole 30 (the vicinity of the end portion 30e) when the magnetization of the magnetic pole 30 reverses. The magnetic domains become an energy barrier. It is considered that the change of the magnetic domains is nonuniform when the recording current Iw changes between positive and negative. Fluctuation occurs easily when the recording current Iw changes between positive and negative. It is considered that the fluctuation of the change of the recording magnetic field Hw is therefore large.

Conversely, it is considered that when the direct current Idc is supplied, the direct current Idc acts as a bias; and the complex magnetic domains do not form easily. It is considered that the fluctuation of the change of the recording magnetic field Hw is suppressed thereby.

The phenomenon of the fluctuation of the recording magnetic field Hw improving when the direct current Idc is supplied was newly discovered by the inventor. The embodiments are derived based on this newly-discovered phenomenon.

In the embodiment, the direct current Idc is supplied from the first electrical circuit 20D to the magnetic pole 30, the conductive member 28, and the first shield 31. The fluctuation of the recording magnetic field Hw is suppressed; and the jitter is suppressed. For example, the on-track performance can be improved. The recording density can be increased.

In the embodiment, the direct current Idc may not be a perfectly direct current. The magnitude of the direct current Idc may change. The ratio of the difference between the maximum value of the magnitude of the direct current Idc and the minimum value of the magnitude of the direct current Idc to the average value of the maximum value and the minimum value is, for example, 10% or less. For example, the direct current Idc may have a fluctuation (e.g., noise, etc.) of about 10%.

As shown in FIG. 3C, it was found that the rise of the recording magnetic field Hw when the direct current Idc flows (the ON-state "ON") (the solid line) is steeper than the rise of the recording magnetic field Hw when the direct current Idc does not flow (the OFF-state "OFF").

It is considered that this is because the magnetic domains of the magnetic pole 30 are stabilized by the direct current Idc flowing; and the magnetic domains reverse in a short period of time.

For example, the gradient of the rise of the recording magnetic field Hw when the direct current Idc flows (the ON-state "ON") (the solid line) is about 3.28 kOe/10 ps. The gradient of the rise of the recording magnetic field Hw when the direct current Idc does not flow (the OFF-state "OFF") (the dotted line) is about 2.32 kOe/10 ps.

The rise of the recording magnetic field Hw when the direct current Idc is supplied is faster, and is 1.5 times the rise when the direct current Idc is not supplied. The delay of the recording magnetic field Hw with respect to the change of the recording current Iw can be small. Applications to high-frequency recording are possible by supplying the direct current Idc. Thereby, for example, the write operation can be improved. For example, the on-track recording density can be increased.

An example of characteristics when changing the rise time of the recording current Iw will now be described. The characteristics for both the case where the direct current Idc is supplied and the case where the direct current Idc is not supplied will be described.

Figure 4:
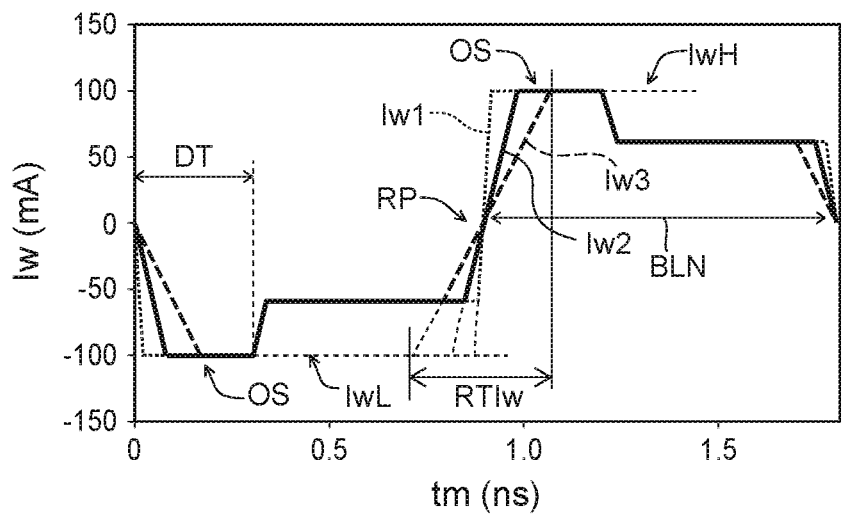
FIG. 4 is a graph illustrating characteristics of the magnetic recording device.

FIG. 4 is a graph illustrating characteristics of the magnetic recording device.

The horizontal axis of FIG. 4 corresponds to the time tm (ns). The vertical axis of FIG. 4 corresponds to the recording current Iw (mA). Three types of recording currents Iw (recording currents Iw1 to Iw3) are illustrated in FIG. 4.

In the example, an overshoot OS is provided in the recording current Iw when reversing. The overshoot OS has a duration time DT.

The recording current Iw has a minimum value IwL and a maximum value IwH. The recording current Iw at the negative overshoot OS corresponds to the minimum value IwL. The recording current Iw at the positive overshoot OS corresponds to the maximum value IwH.

For example, the transition of the recording current Iw from one polarity (in the example, the negative polarity) to the other polarity (in the example, the positive polarity) is taken as a rise portion RP. The gradient (the change rate) of the recording current Iw at the rise portion RP is different between the three types of recording currents Iw (the recording currents Iw1 to Iw3). The difference between the gradients corresponds to the difference of a rise time RTIw.

The difference between the maximum value IwH and the minimum value IwL corresponds to the product of the rise time RTIw and the gradient of the recording current Iw at the rise portion RP.

In the example, the rise time RTIw is 50 ps for the recording current Iw1 of the dotted line. The rise time RTIw is 175 ps for the recording current Iw2 of the solid line. The rise time RTIw is 325 ps for the recording current Iw3 of the broken line.

For example, the difference between the time when the recording current Iw becomes 0 at the rise portion RP relating to the transition from negative to positive and the time when the recording current Iw becomes 0 at the rise portion RP relating to the transition from positive to negative corresponds to a bit length BLN. In the example, the bit length BLN is 900 ps.

Figure 5:
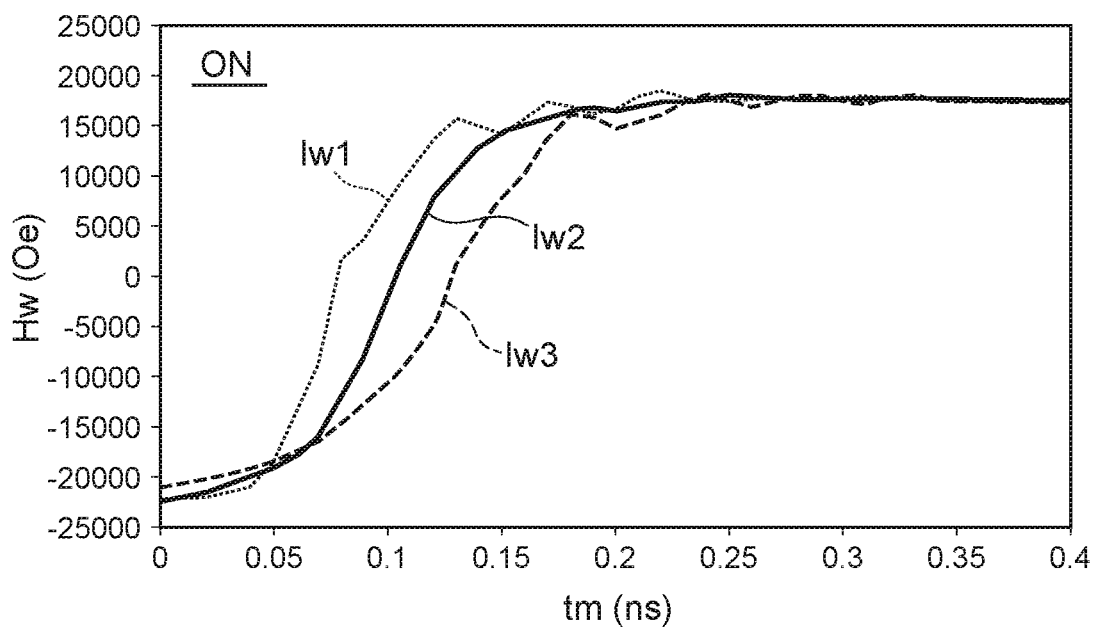
FIG. 5 is a graph illustrating characteristics of the magnetic recording device.
Figure 6:
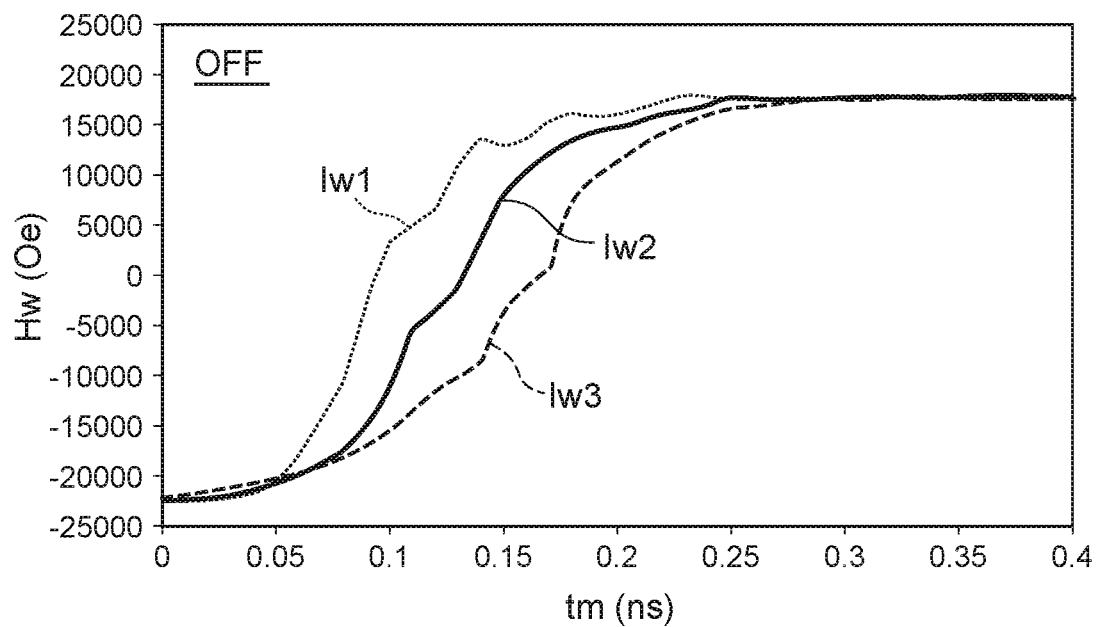
FIG. 6 is a graph illustrating characteristics of the magnetic recording device.

FIG. 5 and FIG. 6 are graphs illustrating the characteristics of the magnetic recording device.

FIG. 5 and FIG. 6 illustrate the change of the recording magnetic field Hw when the recording currents Iw1 to Iw3 illustrated in FIG. 4 are supplied to the coil 30c. FIG. 5 corresponds to when the direct current Idc is supplied (the ON-state "ON"). FIG. 6 corresponds to when the direct current Idc is not supplied (the OFF-state "OFF"). In these figures, the horizontal axis is the time tm (ns). The time when the time tm is 0 ns corresponds to the time of the start of the switching of the recording currents Iw1 to Iw3.

As shown in these figures, the rise characteristic of the recording magnetic field Hw changes according to the difference between the rise times RTIw of the recording currents Iw1 to Iw3. The rise characteristic of the recording magnetic field Hw also changes according to the existence or absence of the direct current Idc (the ON-state "ON" or the OFF-state "OFF").

The time from when the time tm is 0 ns to when the recording magnetic field Hw becomes 0 Oe is taken as a field delay FD. For example, the field delay FD is about 0.1 ns for the characteristic of the solid line (the recording current Iw2) shown in FIG. 5. The field delay FD is determined for each of the six characteristics shown in FIG. 5 and FIG. 6.

Figure 7:
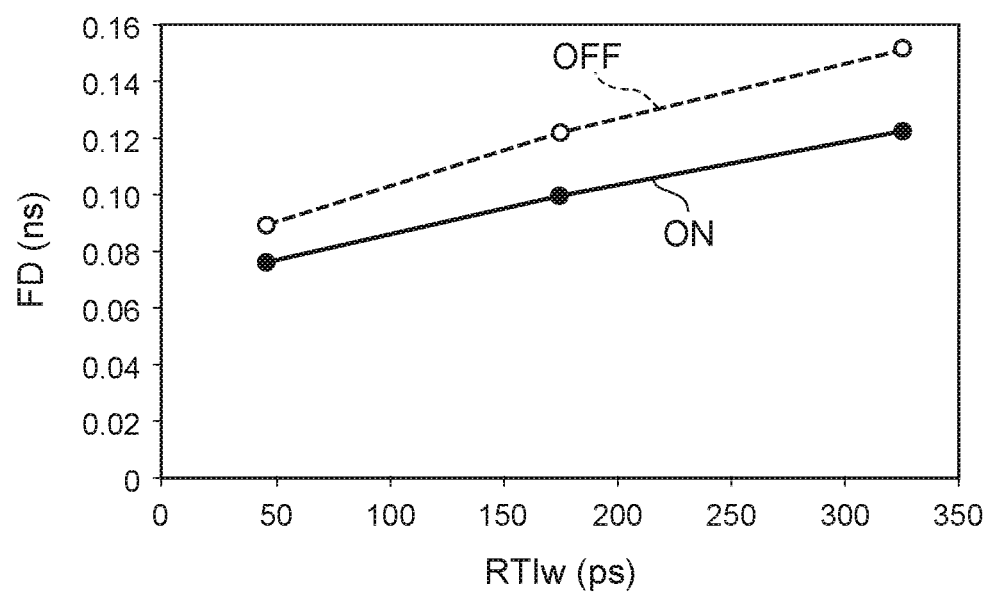
FIG. 7 is a graph illustrating characteristics of the magnetic recording device.

FIG. 7 is a graph illustrating characteristics of the magnetic recording device.

FIG. 7 illustrates the field delay FD for the six characteristics recited above. The horizontal axis corresponds to the rise time RTIw (ps) of the recording current Iw. The vertical axis corresponds to the field delay FD (ns). The six characteristics correspond to the existence or absence of the direct current Idc (the ON-state "ON" or the OFF-state "OFF") for the three recording currents Iw1 to Iw3 illustrated in FIG. 4.

As shown in FIG. 7, the field delay FD increases as the rise time RTIw increases for both the existence and absence of the direct current Idc (the ON-state "ON" or the OFF-state "OFF"). For the same rise time RTIw, the field delay FD when the direct current Idc is supplied (the ON-state "ON") is smaller than the field delay FD when the direct current Idc is not supplied (the OFF-state "OFF").

An example of characteristics of a "magnetic field width" will now be described. The "magnetic field width" is the maximum value of the recording magnetic field Hw in the cross-track direction (FIG. 1A, the Y-axis direction) after the recording current Iw has switched and the recording magnetic field Hw has stabilized. The state after the recording magnetic field Hw has stabilized is, for example, the state when the time tm is 0.2 ns or more in FIG. 5 and FIG. 6.

Figure 8:
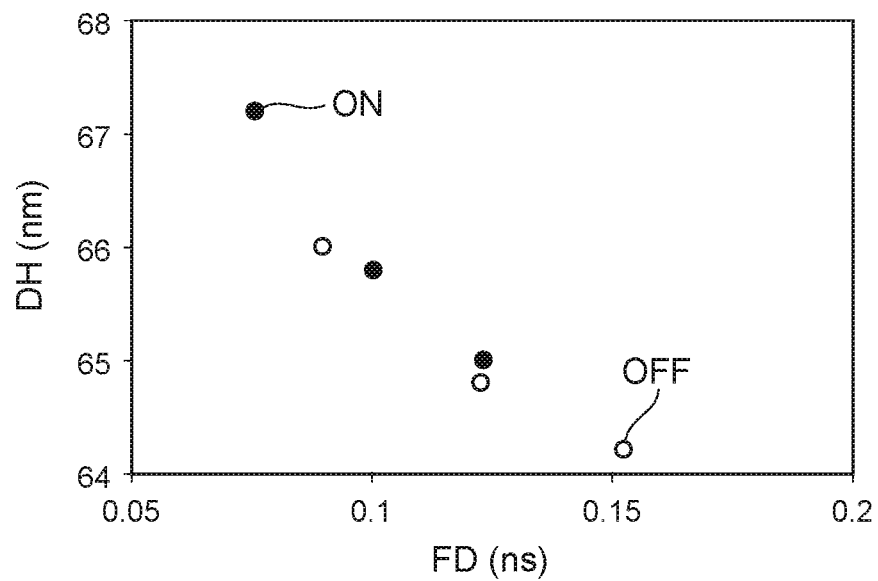
FIG. 8 is a graph illustrating characteristics of the magnetic recording device.

FIG. 8 is a graph illustrating the characteristics of the magnetic recording device.

The horizontal axis of FIG. 8 corresponds to the field delay FD (ns). The vertical axis of FIG. 8 corresponds to a magnetic field width DH (nm). FIG. 8 shows the data when the recording currents Iw1 to Iw3 illustrated in FIG. 4 are supplied to the coil 30c for the existence or absence of the direct current Idc (the ON-state "ON" or the OFF-state "OFF").

It can be seen from FIG. 8 that the magnetic field width DH is large when the field delay FD is small regardless of the existence or absence of the direct current Idc. The magnetic field width DH decreases as the field delay FD increases.

Such a characteristic is a phenomenon newly discovered by the inventor. One cause is considered to be the insufficient magnetization reversal of the side shields (the third shield 33 and the fourth shield 34) and the increase of the magnetic field width DH when the field delay FD is small.

Figure 9:
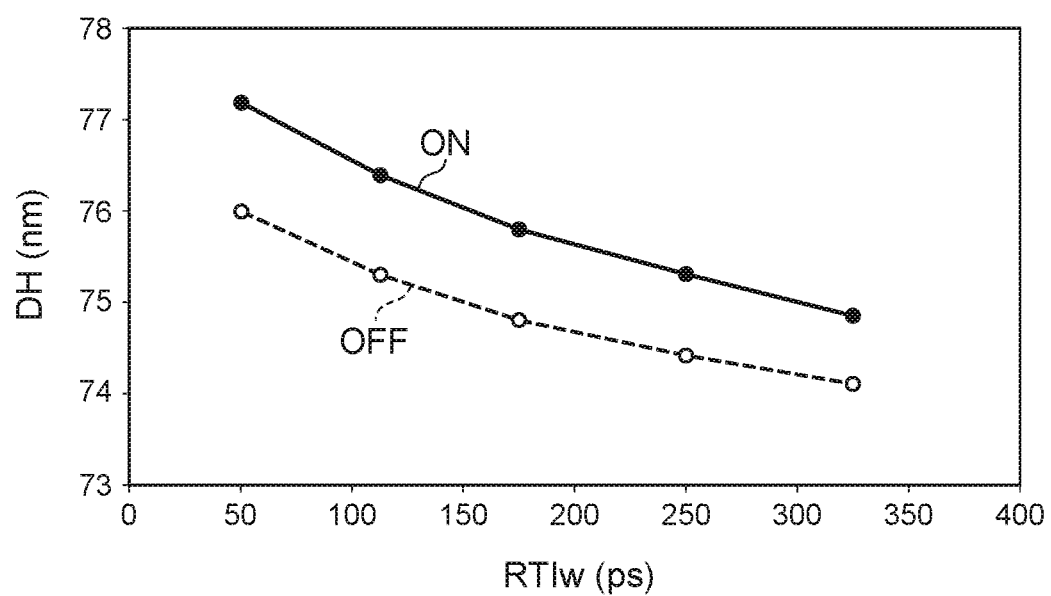
FIG. 9 is a graph illustrating characteristics of the magnetic recording device.

FIG. 9 is a graph illustrating characteristics of the magnetic recording device.

Figure 10:
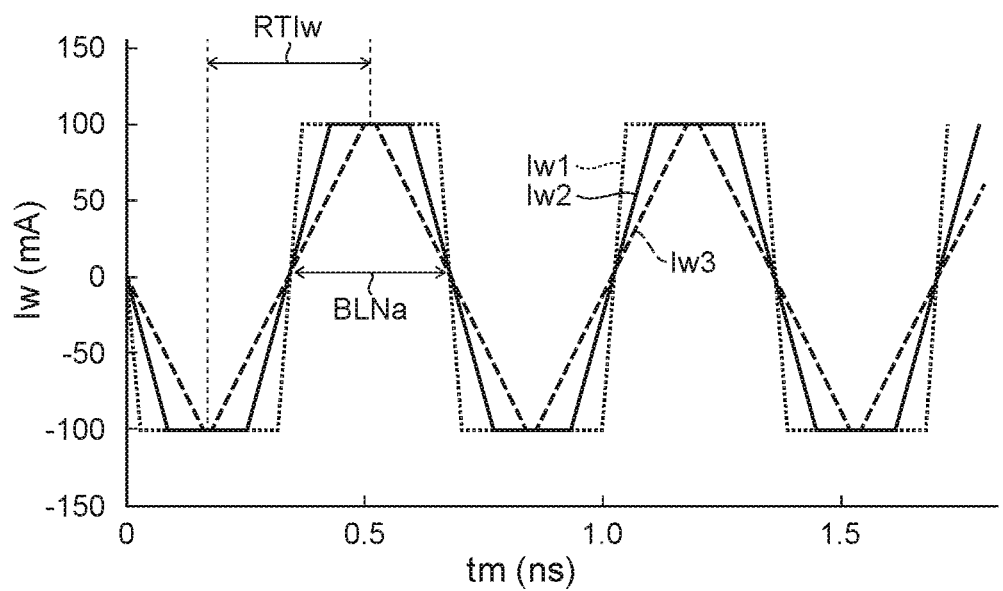
FIG. 10 is a schematic view illustrating the recording currents of the magnetic recording device.

FIG. 10 is a schematic view illustrating the recording currents of the magnetic recording device.

The horizontal axis of FIG. 9 corresponds to the rise time RTIw (ps) of the recording current Iw. The vertical axis of FIG. 9 corresponds to the magnetic field width DH (nm). FIG. 9 illustrates the characteristics of the recording current Iw of the shortest bit length (referring to FIG. 10).

The horizontal axis of FIG. 10 is the time tm (ps). The vertical axis of FIG. 10 is the recording current Iw. The waveform of the recording current Iw of the shortest bit length is the waveform of only the overshoot portion. In the example, a shortest bit length BLNa is 0.34 ns (340 ps). The rise time RTIw is 50 ps, 175 ps, and 325 ps respectively for the recording currents Iw1 to Iw3 illustrated in FIG. 10. FIG. 9 shows the data when such recording currents Iw1 to Iw3 are supplied to the coil 30c for the existence or absence of the direct current Idc (the ON-state "ON" or the OFF-state "OFF").

It can be seen from FIG. 9 that the magnetic field width DH decreases as the rise time RTIw of the recording current Iw increases for both the existence and absence of the supply of the direct current Idc.

Focusing on the rise times RTIw for which the same magnetic field width DH is obtained, the rise time RTIw in the ON-state "ON" is larger than the rise time RTIw in the OFF-state "OFF." For example, the rise time RTIw for which the magnetic field width DH of 76 nm is obtained in the ON-state "ON" is about 150 ps. The rise time RTIw for which the magnetic field width DH of 76 nm is obtained in the OFF-state "OFF" is about 50 ps. Thus, by setting the rise time RTIw in the ON-state "ON" to be larger than the rise time RTIw in the OFF-state "OFF" by about 100 ps, an excessively large magnetic field width DH (the width of the magnetic field in the cross-track direction) can be suppressed.

Examples of the relationship between the rise time RTIw and the bit error rate and the relationship between the rise time RTIw and the surface recording density will now be described.

Figure 11:
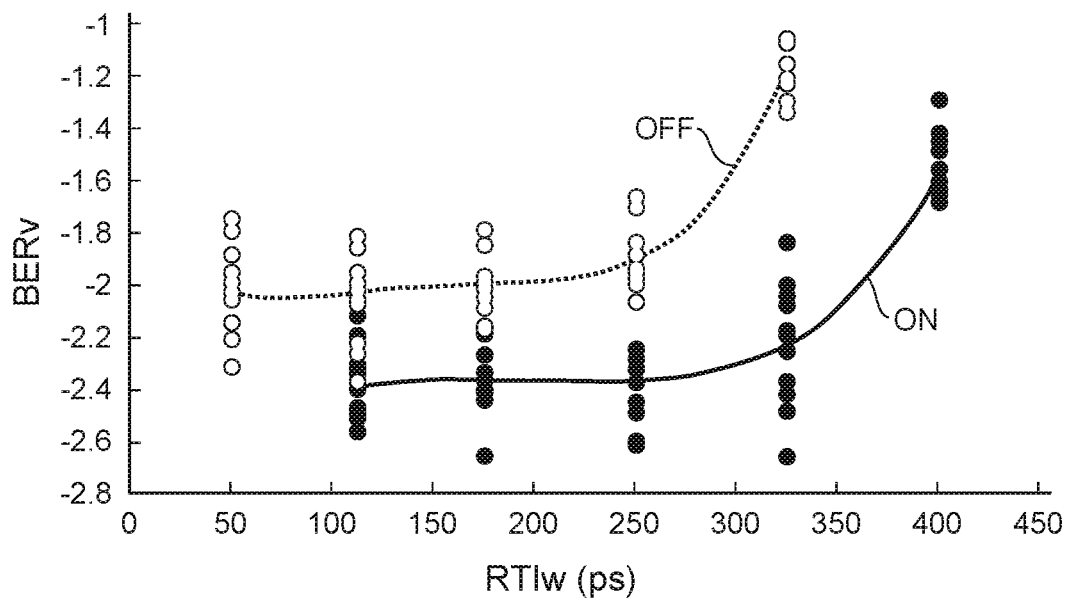
FIG. 11 is a graph illustrating characteristics of the magnetic recording device.

FIG. 11 is a graph illustrating characteristics of the magnetic recording device.

The horizontal axis of FIG. 11 is the rise time RTIw. The vertical axis of FIG. 11 is a bit error rate value BERv. The bit error rate value BERv is a logarithm (base 10) of the bit error rate. The bit error rate value BERv corresponds to the on-track characteristic. FIG. 11 illustrates the characteristics for the existence or absence of the direct current Idc (the ON-state "ON" or the OFF-state "OFF").

As shown in FIG. 11, the bit error rate value BERv is relatively independent of the rise time RTIw in the region where the rise time RTIw is relatively small. In this region, the bit error rate value BERv in the ON-state "ON" is smaller than the bit error rate value BERv in the OFF-state "OFF."

The bit error rate value BERv steeply degrades when the rise time RTIw exceeds some value. The rise time RTIw (the threshold) at which the bit error rate value BERv degrades steeply is different between the existence or absence of the direct current Idc. The threshold of the rise time RTIw in the ON-state "ON" is greater than the threshold of the rise time RTIw in the OFF-state "OFF."

Thus, as the rise time RTIw increases, the magnetic field width DH decreases (referring to FIG. 9); and the off-track characteristic improves. However, when the rise time RTIw becomes excessively large (exceeds the threshold), the bit error rate value BERv degrades (referring to FIG. 11); and the on-track characteristic degrades.

The surface recording density of the magnetic recording device is affected by both the off-track characteristic and the on-track characteristic.

Figure 12:
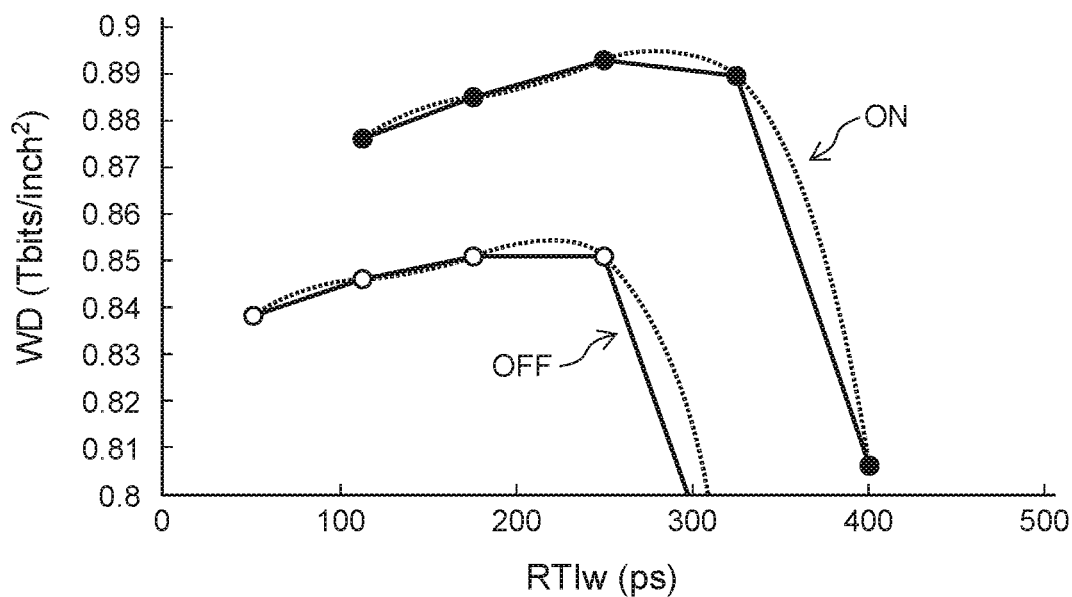
FIG. 12 is a graph illustrating characteristics of the magnetic recording device.

FIG. 12 is a graph illustrating characteristics of the magnetic recording device.

The horizontal axis of FIG. 12 is the rise time RTIw. The vertical axis of FIG. 12 is a surface recording density WD (Tbits/inch$^2$). The surface recording density WD corresponds to both the on-track characteristic and the off-track characteristic. FIG. 12 illustrates the characteristics for the existence or absence of the direct current Idc (the ON-state "ON" or the OFF-state "OFF").

As shown in FIG. 12, the surface recording density WD has a maximum at some rise time RTIw for the ON-state "ON" and for the OFF-state "OFF." The maximum value of the surface recording density WD in the ON-state "ON" is higher than the maximum value of the surface recording density WD in the OFF-state "OFF." The rise time RTIw at which the surface recording density WD has a maximum in the ON-state "ON" is larger than the rise time RTIw at which the surface recording density WD has a maximum in the OFF-state "OFF."

In the example, the rise time RTIw at which the surface recording density WD has the maximum in the ON-state "ON" is about 300 ps. On the other hand, the rise time RTIw at which the surface recording density WD has the maximum in the OFF-state "OFF" is about 220 ps.

For example, the jitter is small in the ON-state "ON" (referring to FIG. 3A). It is considered that the maximum surface recording density WD obtained for the same rise time RTIw is therefore larger. The rise of the recording magnetic field Hw is fast in the ON-state "ON" (referring to FIG. 3C). Therefore, a large rise time RTIw can be used in the ON-state "ON."

In the example as described above, the shortest bit length BLNa is 340 ps. The rise time RTIw at which the surface recording density WD has the maximum in the OFF-state "OFF" is about 220 ps. This value corresponds to 64.7% of the shortest bit length BLNa. The rise time RTIw at which the surface recording density WD has the maximum can have a larger value in the ON-state "ON" than in the OFF-state "OFF." For example, in the ON-state "ON," a rise time RTIw that exceeds 64.7% of the shortest bit length BLNa (e.g., 65% or more) can be used.

In the example shown in FIG. 12, the rise time RTIw at which the surface recording density WD has the maximum in the ON-state "ON" is about 300 ps. This value corresponds to 88% of the shortest bit length BLNa.

In the embodiment, for example, recording at 2.94 Gbps is performed. At this time, the shortest bit length BLNa corresponds to 0.34 ns.

In the embodiment, for example, a magnetic field width DH that is equal to or greater than the magnetic field width DH in the OFF-state "OFF" is obtained in the ON-state "ON" even when the rise time RTIw of the recording current Iw is set to be not less than 65% of 1 bit (the shortest bit length BLNa). For example, in the ON-state "ON," the rise time RTIw of the recording current Iw may be not less than 85% of 1 bit. The rise time RTIw of the recording current Iw in the ON-state "ON" can be markedly larger than the rise time RTIw of the recording current Iw in the OFF-state "OFF."

As described above, by supplying the direct current Idc (the ON-state "ON"), the jitter of the recording magnetic field Hw can be suppressed; and the performance in the on-track direction can be improved. When supplying the direct current Idc (the ON-state "ON"), the field delay FD decreases; and the magnetic field width DH increases (referring to FIG. 7 and FIG. 8). Therefore, a loss may occur in the cross-track direction. In such a case, the loss in the cross-track direction can be suppressed by correcting the rise time RTIw of the recording current Iw by supplying the direct current Idc (the ON-state "ON").

In the embodiment, for example, the rise time RTIw of the recording current Iw is not less than 65% of the time of 1 bit (the shortest bit length BLNa). An excessively large magnetic field width DH is suppressed thereby. The loss in the cross-track direction can be suppressed.

Thus, the coil 30c and the second electrical circuit 30D configured to supply the recording current Iw to the coil 30c are further provided in the magnetic recording device 210. The recording magnetic field Hw that corresponds to the recording current Iw is generated from the magnetic pole 30. In one example, the rise time RTIw of the recording current Iw is not less than 65% of the time of 1 bit (the shortest bit length BLNa).

As described in reference to FIG. 9 and FIG. 11, the on-track characteristic in the "ON" state is superior to the on-track characteristic in the "OFF" state. This shows that the linear recording density in the "ON" state is better than the linear recording density in the "OFF" state. On the other hand, the off-track characteristic in the "OFF" state is superior to the off-track characteristic in the "ON" state. This shows that the track density in the "OFF" state is better than the track density in the "OFF" state.

In the embodiment, the operation may be switched between the operation in the "ON" state and the operation in the "OFF" state according to the specification of the hard disk (the magnetic recording medium 80). For example, the operation may be switched between the operation in the "ON" state and the operation in the "OFF" state inside one hard disk (magnetic recording medium 80). For example, the operation in the "ON" state may be performed in a portion where at least one of the linear recording density or the surface recording density is given priority. For example, the operation in the "OFF" state may be performed in a portion where the track density is given priority. For example, the specification of the hard disk can be accommodated more specifically.

Figure 13:
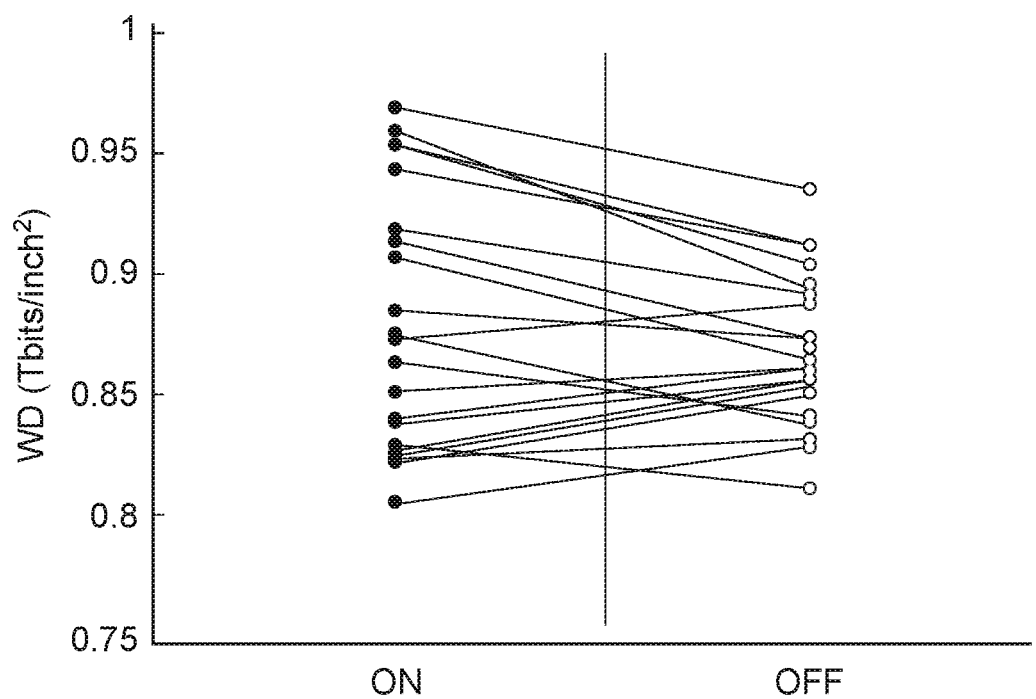
FIG. 13 is a schematic view illustrating characteristics of the magnetic recording device.

FIG. 13 is a schematic view illustrating characteristics of the magnetic recording device.

FIG. 13 shows the measurement results of the surface recording density WD in the ON-state "ON" and the OFF-state "OFF" for multiple samples of the magnetic head. The vertical axis of FIG. 13 is the surface recording density WD (Tbits/inch$^2$).

A waveform similar to that of FIG. 9 (referring to FIG. 10) is used in the measurement. In FIG. 13, one of the multiple symbols of the ON-state "ON" and one of the symbols of the OFF-state "OFF" are connected by a straight line. The two symbols that are connected by the straight line correspond to one of the multiple samples of the magnetic head.

For the multiple samples illustrated in FIG. 13, the average of the surface recording density WD in the ON-state "ON" is 0.88 Tbits/inch$^2$. On the other hand, the average of the surface recording density WD in the OFF-state "OFF" is 0.858 Tbits/inch$^2$. Thus, compared to the OFF-state "OFF," the surface recording density WD is improved in the ON-state "ON." In the example, the amount of the improvement is 2.5%.

In the example, the fluctuation of the surface recording density WD of the multiple magnetic heads in the ON-state "ON" is larger than the fluctuation of the surface recording density WD of the multiple magnetic heads in the OFF-state "OFF."

For example, for some samples, the surface recording density WD is particularly low in the OFF-state "OFF." A high surface recording density WD is obtained more effectively for such samples by using the ON-state "ON."

Figure 14:
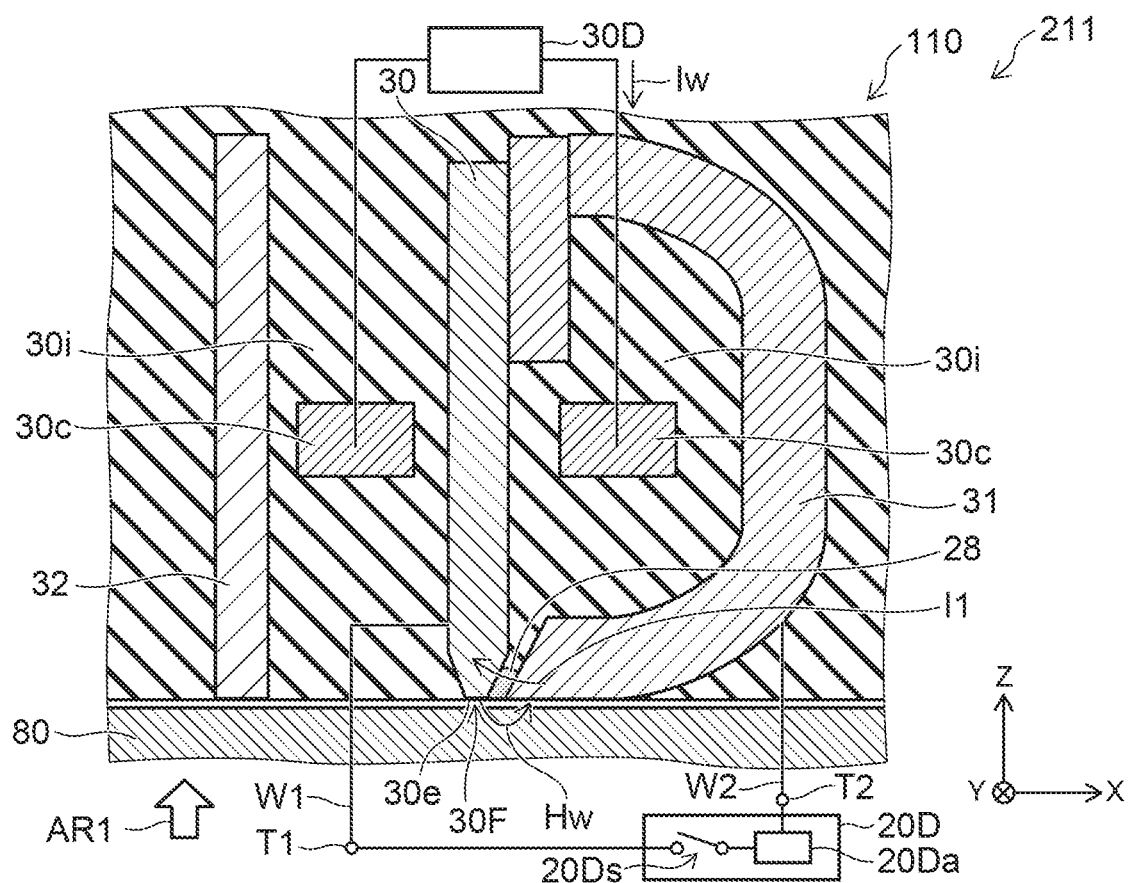
FIG. 14 is a schematic cross-sectional view illustrating a magnetic recording device according to the first embodiment.

FIG. 14 is a schematic cross-sectional view illustrating a magnetic recording device according to the first embodiment.

In the magnetic recording device 211 as shown in FIG. 14, the first electrical circuit 20D includes a direct current circuit 20Da and a switch 20Ds. The switch 20Ds can switch between ON/OFF of the supply of the direct current Idc from the direct current circuit 20Da.

For example, the first electrical circuit 20D is configured to perform a first operation and a second operation. In the first operation, the first electrical circuit 20D supplies a first current to the magnetic pole 30, the conductive member 28, and the first shield 31. The first current I1 is, for example, the direct current Idc. In the second operation, the first electrical circuit 20D does not supply the first current I1 recited above to the magnetic pole 30, the conductive member 28, and the first shield 31. For example, the switching between such a first operation and such a second operation is performed by the switch 20Ds. The switch 20Ds also can be considered to be a different body from the first electrical circuit 20D.

For example, the second electrical circuit 30D sets the rise time RTIw (e.g., a first rise time) of the recording current Iw in the first operation to be longer than the rise time RTIw (e.g., a second rise time) of the recording current Iw in the second operation. For example, the excessive increase of the magnetic field width DH can be suppressed.

The difference between the first rise time recited above and the second rise time recited above is, for example, 80 picoseconds (ps) or more. The difference may be 100 ps or more.

For example, in the first operation, the rise time RTIw of the recording current Iw is not less than 65% of the time of 1 bit. The rise time RTIw may be not less than 60% of the time of 1 bit. The rise time RTIw may be not less than 65% of the time of 1 bit. The rise time RTIw may be not less than 85% of the time of 1 bit.

In the second operation, a current substantially does not flow in the magnetic pole 30, the conductive member 28, and the first shield 31. Or, the current that flows in the magnetic pole 30, the conductive member 28, and the first shield 31 in the second operation is smaller than the first current I1 (e.g., the direct current Idc) in the first operation. In the second operation, the current that flows in the magnetic pole 30, the conductive member 28, and the first shield 31 is, for example, not more than 1/10 of the first current I1.

In the embodiment, the operation may switch between the first operation and the second operation. For example, the specifications of the hard disk can be accommodated more specifically.

Second Embodiment

Figure 15A:
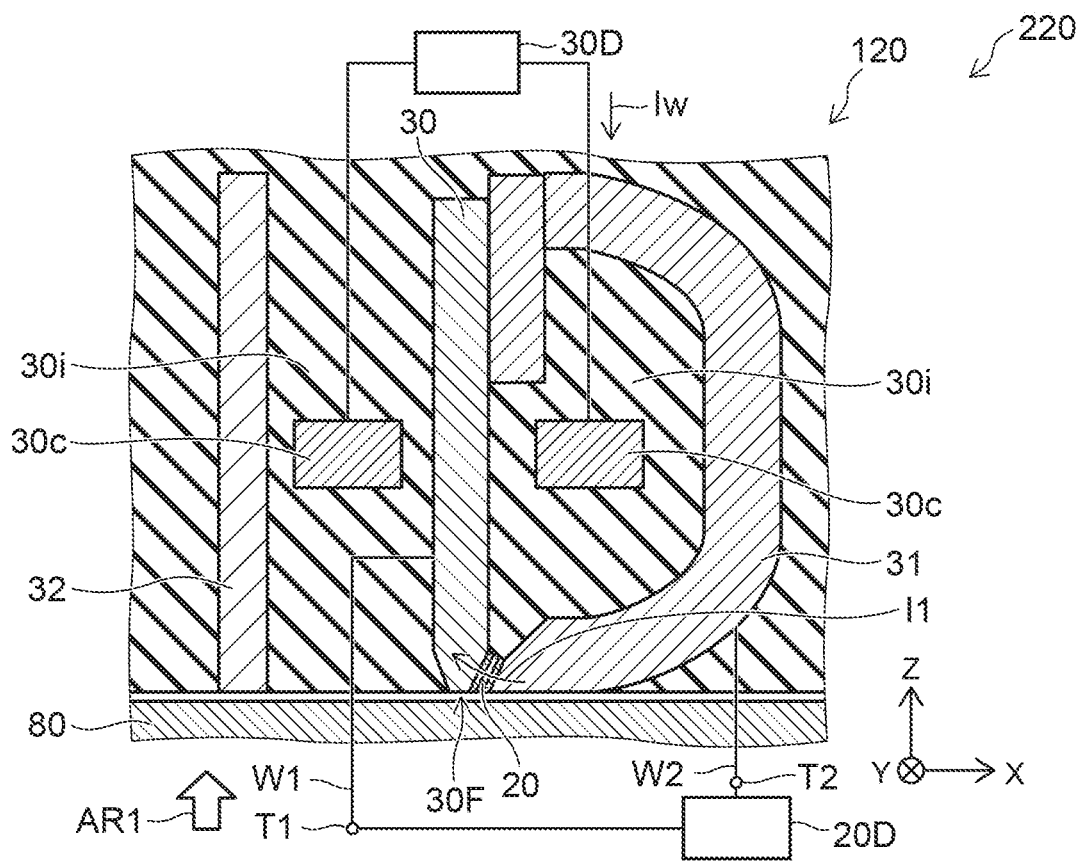
FIG. 15A and FIG. 15B are schematic cross-sectional views illustrating a magnetic recording device according to a second embodiment.
Figure 15B:
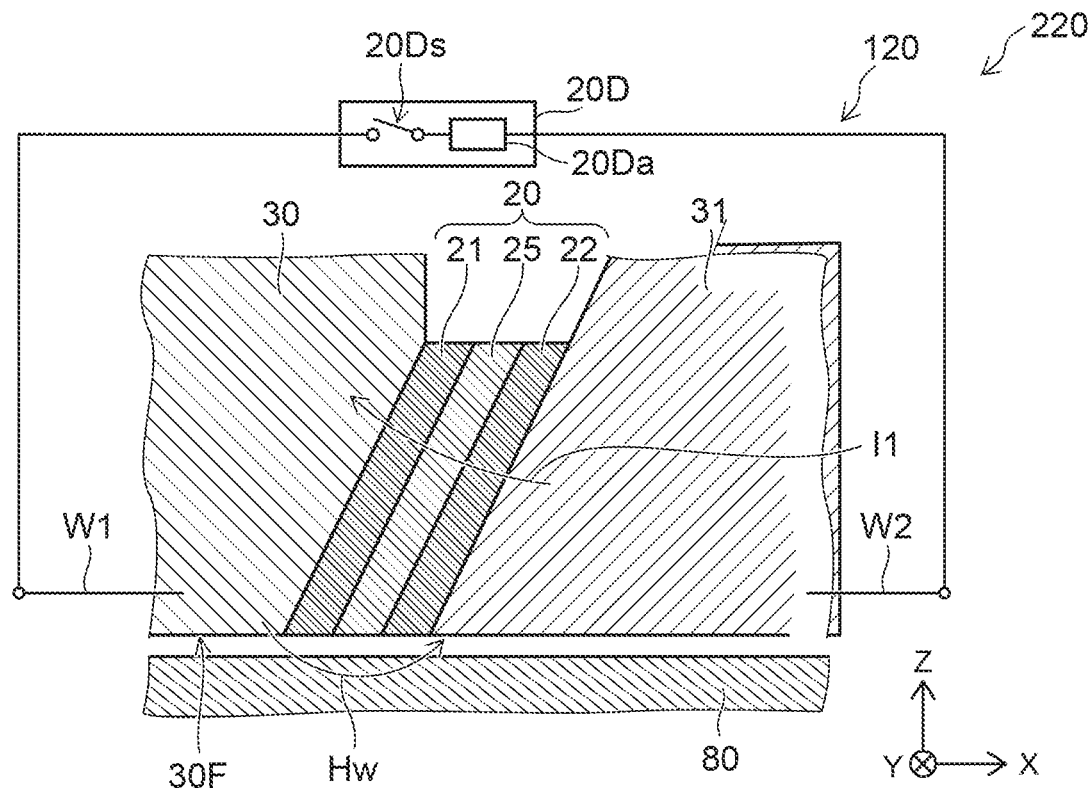

FIG. 15A and FIG. 15B are schematic cross-sectional views illustrating a magnetic recording device according to a second embodiment.

FIG. 15B is an enlarged view of a portion of FIG. 15A.

As shown in FIG. 15A, the magnetic recording device 220 includes a magnetic head 120 and the first electrical circuit 20D. The magnetic head 120 includes the magnetic pole 30, the first shield 31, and a conductive member 20. In the example, the magnetic head 120 further includes the second shield 32 and the coil 30c. The magnetic head 120 may further include the third shield 33 and the fourth shield 34 (referring to FIG. 1B).

As shown in FIG. 15B, the first electrical circuit 20D is configured to supply the first current I1 to the magnetic pole 30, the conductive member 20, and the first shield 31. The first current I1 is, for example, the direct current Idc. The direct current circuit 20Da and the switch 20Ds may be provided in the first electrical circuit 20D. The first electrical circuit 20D may switch the operation between ON/OFF of the supply of the first current I1 (the first operation or the second operation).

As shown in FIG. 15B, the configuration of the conductive member 20 in the embodiment is different from the configuration of the conductive member 28 in the first embodiment. Otherwise, the configuration of the magnetic recording device 220 (the magnetic head 120) is similar to the configuration of the magnetic recording device 210 or 211 (the magnetic head 110). An example of the conductive member 20 will now be described.

As shown in FIG. 15B, the conductive member 20 includes a magnetic layer 25, a first conductive layer 21, and a second conductive layer 22. The magnetic layer 25 is provided between the magnetic pole 30 and the first shield 31. The magnetic layer 25 includes, for example, at least one selected from the group consisting of Fe, Co, and Ni.

The first conductive layer 21 is provided between the magnetic pole 30 and the magnetic layer 25. The first conductive layer 21 contacts the magnetic pole 30 and the magnetic layer 25. The first conductive layer 21 includes one of a first material or a second material; and the first conductive layer 21 is nonmagnetic.

The second conductive layer 22 is provided between the magnetic layer 25 and the first shield 31. The second conductive layer 22 contacts the magnetic layer 25 and the first shield 31. The second conductive layer 22 includes the other of the first material or the second material. The second conductive layer 22 is nonmagnetic.

The first material includes at least one selected from the group consisting of Ta, Pt, W, Ru, Mo, Ir, Rh, and Pd. The second material includes at least one selected from the group consisting of Cu, Ag, and Au.

In one example, the first conductive layer 21 includes the first material; and the second conductive layer 22 includes the second material. For example, the first conductive layer 21 includes Ta; and the second conductive layer 22 includes Cu. In such a case, for example, the first current I1 has the orientation from the first shield 31 toward the magnetic pole 30.

In another example, the first conductive layer 21 includes the second material; and the second conductive layer 22 includes the first material. For example, the first conductive layer 21 includes Cu; and the second conductive layer 22 includes Ta. In such a case, the first current I1 has the orientation from the magnetic pole 30 toward the first shield 31.

By such a configuration, the recording magnetic field Hw that is emitted from the magnetic pole 30 is suppressed from being oriented directly toward the first shield 31. The recording magnetic field Hw is oriented easily toward the magnetic recording medium 80. The recording magnetic field Hw is applied efficiently to the magnetic recording medium 80. More efficient recording is possible. The recording density can be increased.

In the magnetic recording device 220 as well, the fluctuation of the recording magnetic field Hw is suppressed by supplying the first current I1. The jitter is suppressed. For example, the on-track performance can be improved. For example, the on-track recording density can be increased.

The first operation and the second operation recited above may be performed in the magnetic recording device 220. For example, the second electrical circuit 30D sets the rise time RTIw (e.g., the first rise time) of the recording current Iw in the first operation to be longer than the rise time RTIw (e.g., the second rise time) of the recording current Iw in the second operation. The difference between the first rise time and the second rise time is, for example, 80 picoseconds or more. For example, in the first operation, the rise time RTIw of the recording current Iw is not less than 65% of the time of 1 bit. For example, in the second operation, a current substantially does not flow in the magnetic pole 30, the conductive member 28, and the first shield 31. Or, the current that flows in the magnetic pole 30, the conductive member 28, and the first shield 31 in the second operation is smaller than the first current I1 (e.g., the direct current Idc) in the first operation.

Figure 16:
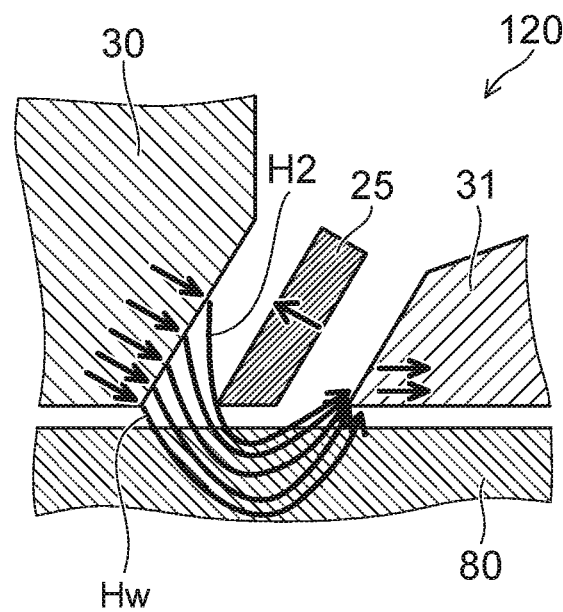
FIG. 16 is a schematic view illustrating an operation of the magnetic recording device according to the second embodiment.

FIG. 16 is a schematic view illustrating an operation of the magnetic recording device according to the second embodiment.

A magnetic field H2 is generated from the magnetic pole 30 by causing the recording current Iw to flow in the coil 30c. A portion of the magnetic field H2 is oriented toward the magnetic recording medium 80 as the recording magnetic field Hw. In a reference example in which the magnetic layer 25 is not provided, the magnetic field H2 is oriented easily toward the first shield 31. As a result, it may be difficult for the recording magnetic field Hw to be applied to the magnetic recording medium 80.

In the magnetic head 120 as shown in FIG. 16, by causing the first current I1 to flow in the magnetic layer 25 (the conductive member 20), the magnetization of the magnetic layer 25 has a component having the reverse orientation of the orientation of the magnetic field H2 emitted from the magnetic pole 30. Therefore, it is difficult for the magnetic field H2 to pass through the magnetic layer 25. Much of the magnetic field H2 becomes the recording magnetic field Hw, passes through the magnetic recording medium 80, and enters the first shield 31. Therefore, the recording magnetic field Hw is easily applied to the magnetic recording medium 80. The magnetic field H2 is effectively applied to the magnetic recording medium 80 even when the recording gap is small.

Figure 17:
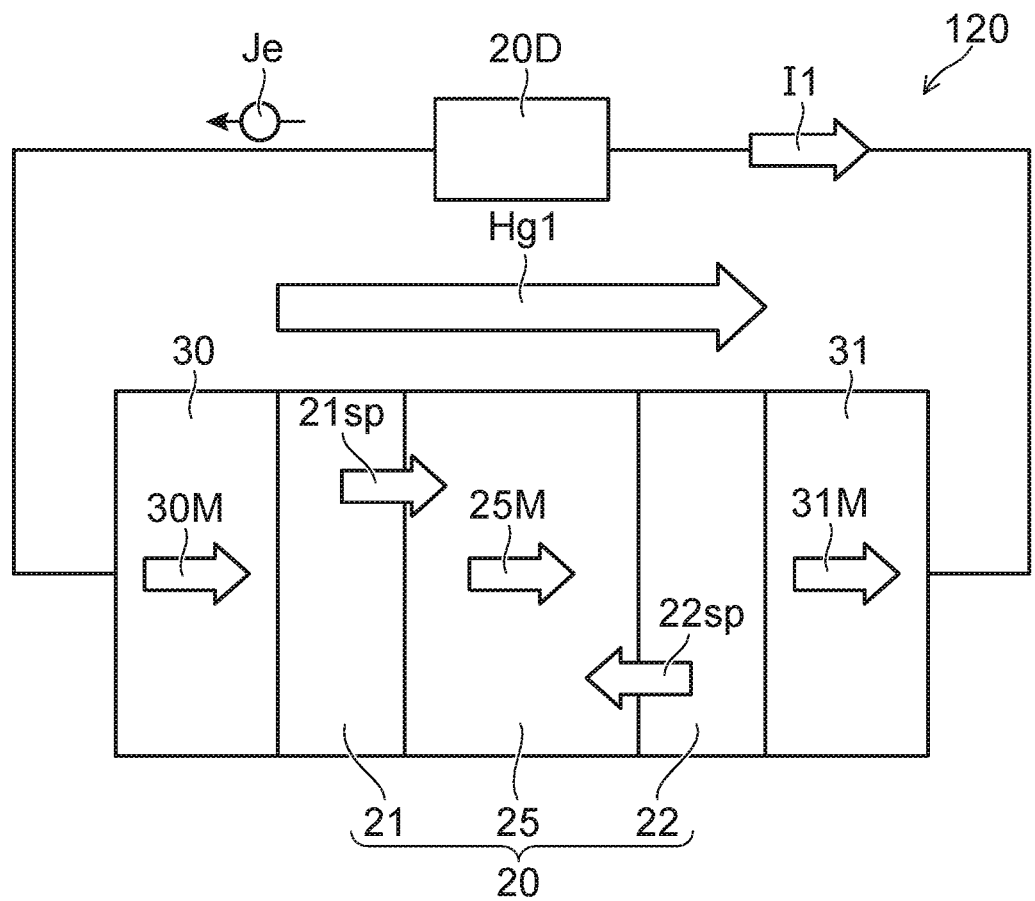
FIG. 17 is a schematic view illustrating the operation of the magnetic recording device according to the second embodiment.

FIG. 17 is a schematic view illustrating the operation of the magnetic recording device according to the second embodiment.

As shown in FIG. 17, the conductive member 20 is provided between the magnetic pole 30 and the first shield 31. The magnetic layer 25, the first conductive layer 21, and the second conductive layer 22 are provided in the conductive member 20.

The recording current Iw is supplied from the second electrical circuit 30D to the coil 30c of the magnetic pole 30 (referring to FIG. 15A). Thereby, a gap magnetic field Hg1 is generated from the magnetic pole 30. The gap magnetic field Hg1 is applied to the conductive member 20.

For example, a magnetization 30M of the magnetic pole 30 and a magnetization 31M of the first shield 31 are substantially parallel to the gap magnetic field Hg1. A magnetization 25M of the magnetic layer 25 is substantially parallel to the gap magnetic field Hg1.

The first current I1 is supplied from the first electrical circuit 20D to the conductive member 20. In the example, the first current I1 is supplied to the conductive member 20 via the first shield 31 and the magnetic pole 30. In the example, the first current I1 flows from the second conductive layer 22 toward the first conductive layer 21. At this time, an electron current Je flows. The electron current Je flows from the first conductive layer 21 toward the second conductive layer 22.

A spin torque 21sp is generated at the interface between the first conductive layer 21 and the magnetic layer 25 by the electron current Je. The spin torque 21sp is transmissive. On the other hand, a spin torque 22sp is generated at the interface between the magnetic layer 25 and the second conductive layer 22 by the electron current Je. The spin torque 22sp is reflective. The magnetization 25M of the magnetic layer 25 reverses due to these spin torques. The reversed magnetization 25M has a component antiparallel to the gap magnetic field Hg1 shown in FIG. 17.

In another example, for example, the first current I1 may flow from the first conductive layer 21 toward the second conductive layer 22. At this time, the orientation of the spin torque 21sp and the orientation of the spin torque 22sp shown in FIG. 17 reverse. The spin torque 21sp is reflective; and the spin torque 22sp is transmissive.

For example, when the first current I1 is not supplied to the magnetic layer 25, the magnetization 25M of the magnetic layer 25 has the reverse orientation of the magnetic field (the gap magnetic field Hg1) generated from the magnetic pole 30. By such a magnetization 25M, the magnetic field that is generated from the magnetic pole 30 can be applied effectively to the magnetic recording medium 80.

In the embodiment, for example, the magnetization 25M of the magnetic layer 25 when the first current I1 is caused to flow between the first conductive layer 21 and the second conductive layer 22 (e.g., between the magnetic pole 30 and the first shield 31) has a component in the reverse direction of the magnetic field (the gap magnetic field Hg1) generated from the magnetic pole 30 when the first current I1 does not flow.

For example, the magnetic layer 25 functions as a "magnetic field control layer" controlling the magnetic field.

Third Embodiment

Figure 18A:
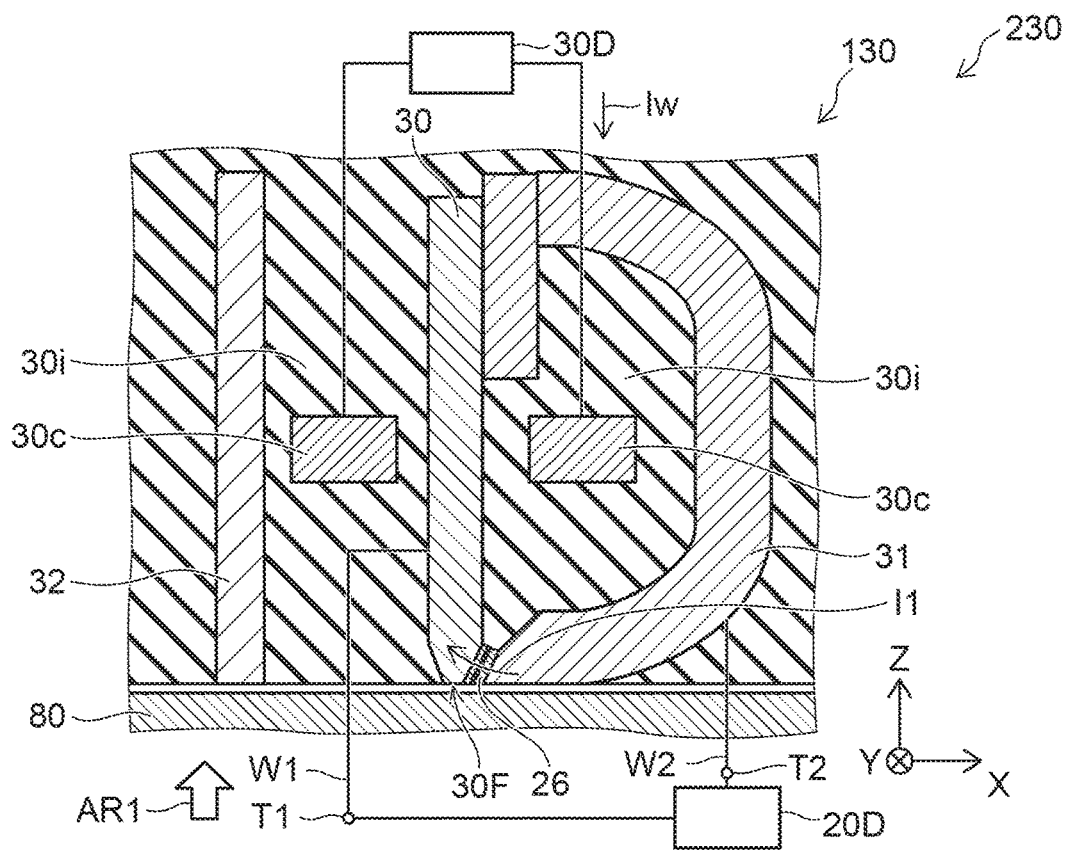
FIG. 18A and FIG. 18B are schematic cross-sectional views illustrating a magnetic recording device according to a third embodiment.
Figure 18B:
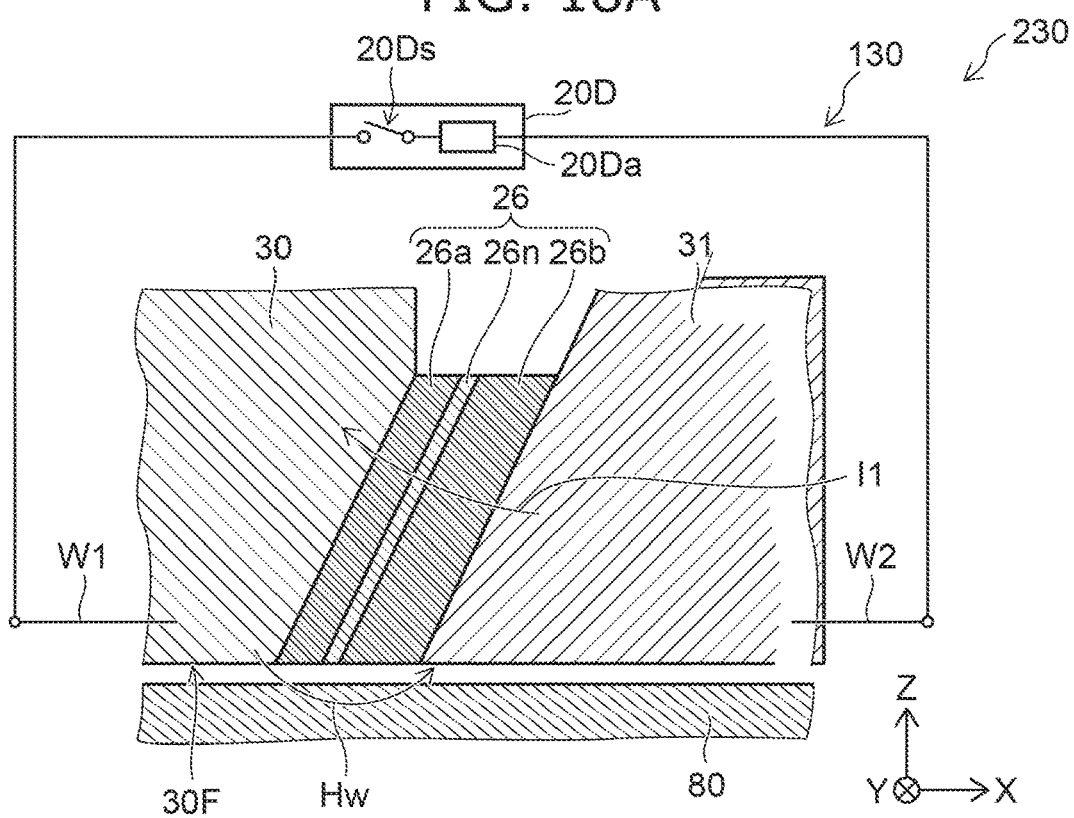

FIG. 18A and FIG. 18B are schematic cross-sectional views illustrating a magnetic recording device according to a third embodiment.

FIG. 18A is a cross-sectional view corresponding to the line A1-A2 cross section of FIG. 1B. FIG. 18B is an enlarged view of a portion of FIG. 18A.

As shown in FIG. 18A, the magnetic recording device 230 includes a magnetic head 130 and the first electrical circuit 20D. The magnetic head 130 includes the magnetic pole 30, the first shield 31, and a conductive member 26. In the example, the magnetic head 130 further includes the second shield 32 and the coil 30c. The magnetic head 130 may further include the third shield 33 and the fourth shield 34 (referring to FIG. 1B).

As shown in FIG. 18B, the first electrical circuit 20D is configured to supply the first current I1 to the magnetic pole 30, the conductive member 26, and the first shield 31. The first current I1 is, for example, the direct current Idc. The direct current circuit 20Da and the switch 20Ds may be provided in the first electrical circuit 20D. The first electrical circuit 20D may switch the operation between ON/OFF of the supply of the first current I1 (the first operation or the second operation).

As shown in FIG. 18B, the configuration of the conductive member 26 in the embodiment is different from the configuration of the conductive member 28 in the first embodiment. Otherwise, the configuration of the magnetic recording device 230 (the magnetic head 130) is similar to the configuration of the magnetic recording device 210 or 211 (the magnetic head 110). An example of the conductive member 26 will now be described.

As shown in FIG. 18B, the conductive member 26 includes a first magnetic layer 26a, a second magnetic layer 26b, and an intermediate layer 26n. The intermediate layer 26n is provided between the first magnetic layer 26a and the second magnetic layer 26b. The intermediate layer 26n is nonmagnetic.

In the example, the first magnetic layer 26a is provided between the magnetic pole 30 and the intermediate layer 26n. The second magnetic layer 26b is provided between the intermediate layer 26n and the first shield 31. As described below, the second magnetic layer 26b may be provided between the magnetic pole 30 and the intermediate layer 26n; and the first magnetic layer 26a may be provided between the intermediate layer 26n and the first shield 31.

Another layer (e.g., an electrode, etc.) may be provided between the magnetic pole 30 and the conductive member 26. Another layer (e.g., an electrode, etc.) may be provided between the first shield 31 and the conductive member 26.

In such a case as well, the first current I1 (e.g., the direct current Idc) is supplied to the conductive member 26 by the first electrical circuit 20D.

Thereby, for example, a high frequency magnetic field is generated from the conductive member 26. The high frequency magnetic field is applied to the magnetic recording medium 80. Due to the high frequency magnetic field, the magnetization of the magnetic recording medium 80 changes easily; and high-density recording is easy. The conductive member 26 is, for example, a spin torque oscillator.

For example, the first magnetic layer 26a functions as an oscillation generation layer. For example, the second magnetic layer 26b functions as a spin injection layer.

The first magnetic layer 26a includes one of the first magnetic material or the second magnetic material. In such a case, the second magnetic layer 26b includes the other of the first magnetic material or the second magnetic material. For example, the first magnetic material includes, for example, at least one selected from the group consisting of an FeCo alloy and a Heusler alloy. The second magnetic material includes, for example, at least one selected from the group consisting of a stacked film including a CoPt alloy, an FePt alloy, Co, and Pd and a stacked film including Co and Pt.

The intermediate layer 26n includes, for example, at least one selected from the group consisting of Cu, Au, and Ag. For example, the first magnetic layer 26a includes the first material; and the second magnetic layer 26b includes the second material. In such a case, as shown in FIG. 18B, the first current I1 has the orientation from the second magnetic layer 26b toward the first magnetic layer 26a. The first current I1 has the orientation from the first shield 31 toward the magnetic pole 30. The magnetization of the first magnetic layer 26a oscillates.

Figure 19:
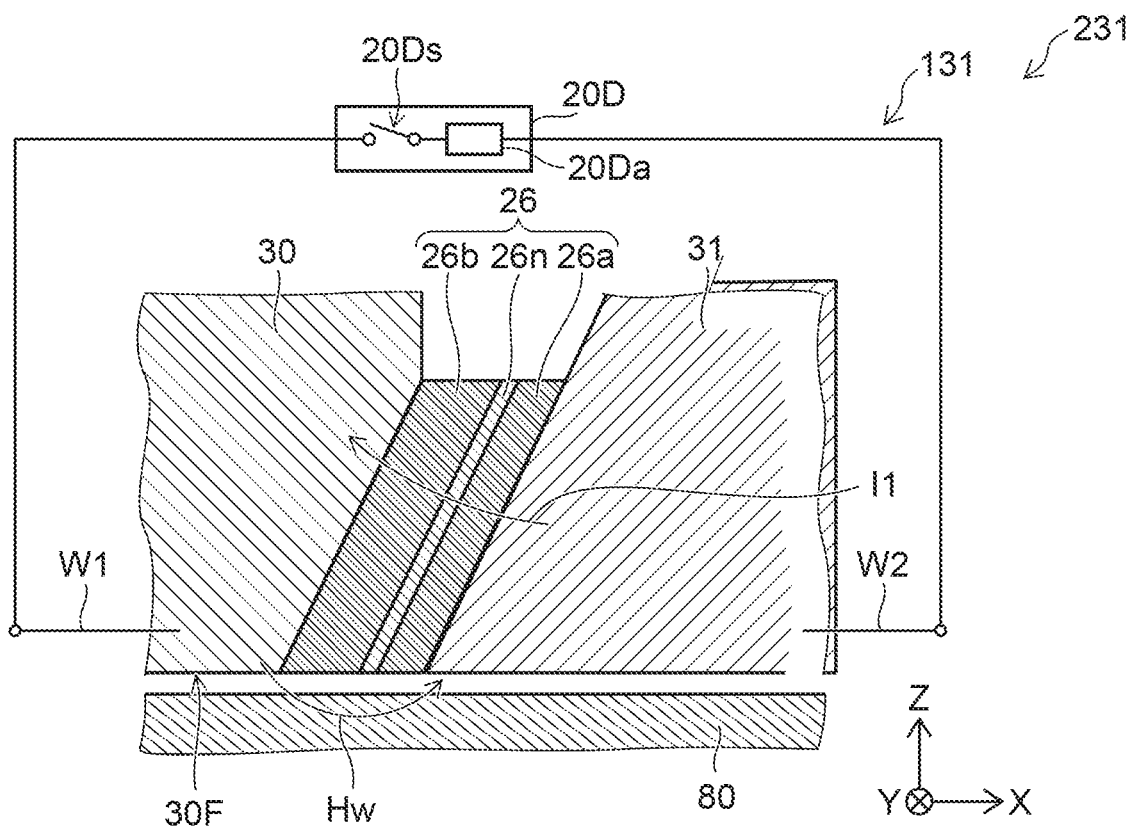
FIG. 19 is a schematic cross-sectional view illustrating a magnetic recording device according to the third embodiment.

FIG. 19 is a schematic cross-sectional view illustrating a magnetic recording device according to the third embodiment.

As shown in FIG. 19, the conductive member 26 is provided in the magnetic recording device 231 (and a magnetic head 131) as well. The positions of the first magnetic layer 26a and the second magnetic layer 26b in the magnetic head 131 are different from the positions of the first magnetic layer 26a and the second magnetic layer 26b in the magnetic head 130. Otherwise, the configuration of the magnetic head 131 is similar to the configuration of the magnetic head 130.

In the magnetic head 131, the second magnetic layer 26b is provided between the magnetic pole 30 and the intermediate layer 26n. The first magnetic layer 26a is provided between the intermediate layer 26n and the first shield 31.

For example, the first magnetic layer 26a includes the first material; and the second magnetic layer 26b includes the second material. In such a case, as shown in FIG. 19, the first current has the orientation from the second magnetic layer 26b toward the first magnetic layer 26a. The first current I1 has the orientation from the magnetic pole 30 toward the first shield 31. The magnetization of the first magnetic layer 26a oscillates.

In the magnetic recording devices 230 and 231, the first operation and the second operation recited above may be performed. For example, the second electrical circuit 30D sets the rise time RTIw (e.g., the first rise time) of the recording current Iw in the first operation to be longer than the rise time RTIw (e.g., the second rise time) of the recording current Iw in the second operation. The difference between the first rise time and the second rise time is 80 picoseconds or more. For example, in the first operation, the rise time RTIw of the recording current Iw is not less than 65% of the time of 1 bit. For example, in the second operation, a current substantially does not flow in the magnetic pole 30, the conductive member 28, and the first shield 31. Or, the current that flows in the magnetic pole 30, the conductive member 28, and the first shield 31 in the second operation is smaller than the first current I1 (e.g., the direct current Idc) in the first operation.

An example of the magnetic recording device according to the embodiment will now be described. The magnetic recording device may be a magnetic recording and reproducing device. The magnetic head may include a recording portion and a reproducing portion.

Figure 20:
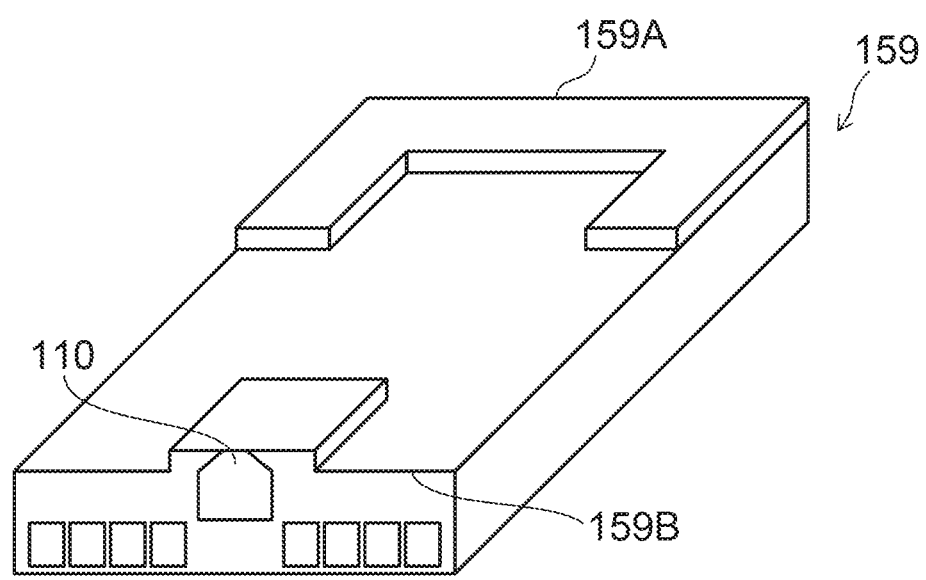
FIG. 20 is a schematic perspective view illustrating a portion of the magnetic recording device according to the embodiment.

FIG. 20 is a schematic perspective view illustrating a portion of the magnetic recording device according to the embodiment.

FIG. 20 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 21:
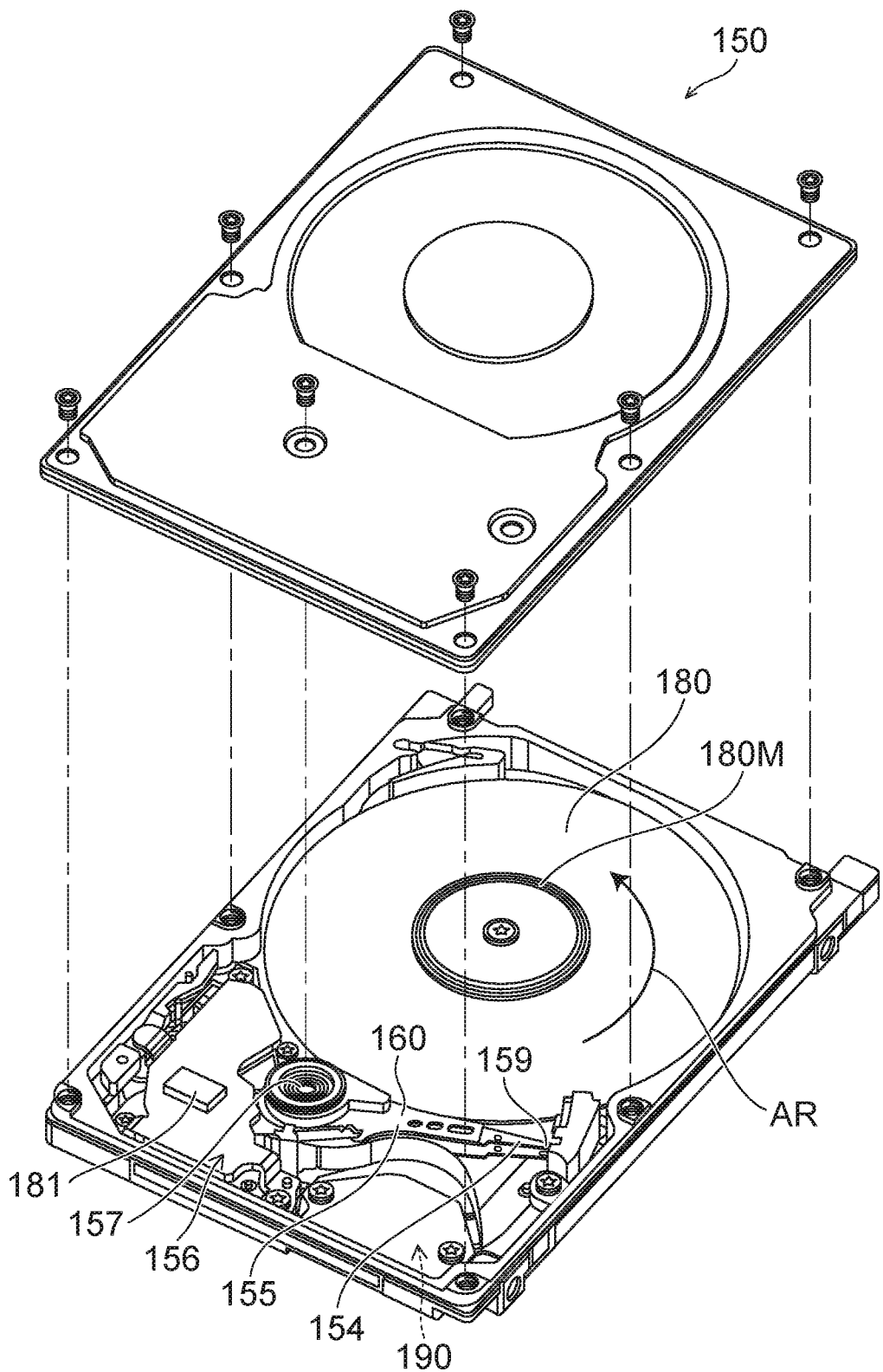
FIG. 21 is a schematic perspective view illustrating the magnetic recording device according to the embodiment.

FIG. 21 is a schematic perspective view illustrating the magnetic recording device according to the embodiment.

Figure 22A:
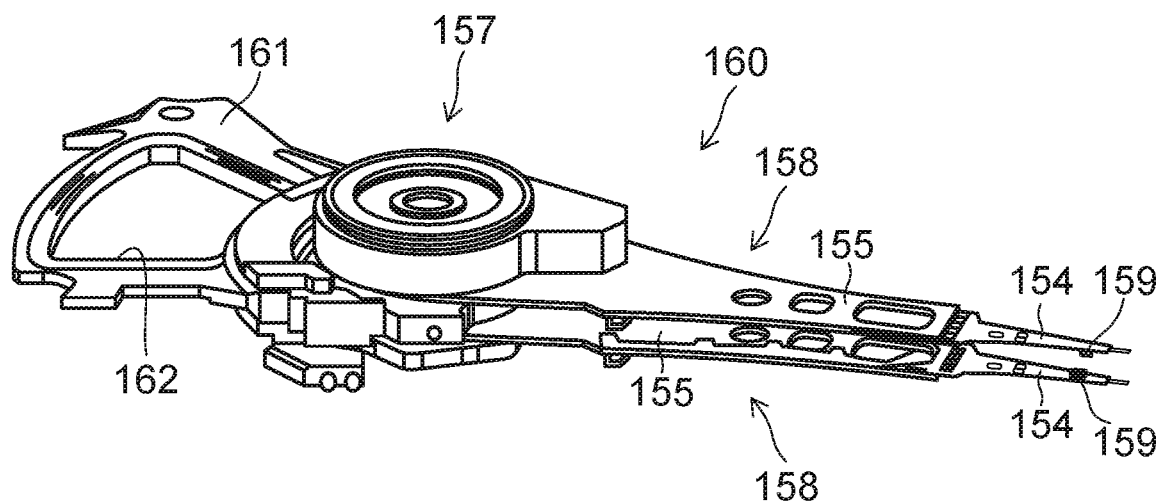
FIG. 22A and FIG. 22B are schematic perspective views illustrating a portion of the magnetic recording device according to the embodiment.
Figure 22B:
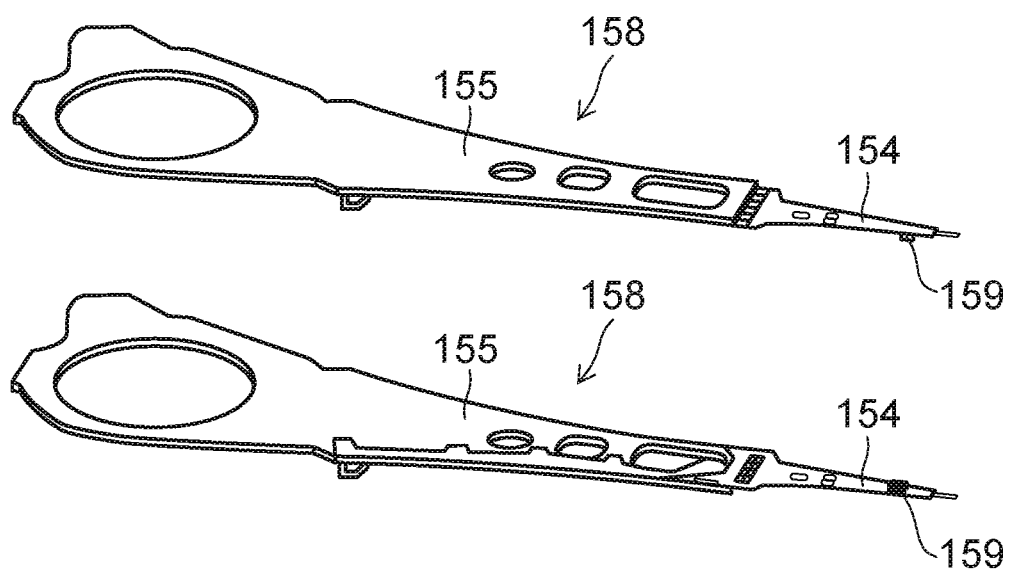

FIG. 22A and FIG. 22B are schematic perspective views illustrating a portion of the magnetic recording device according to the embodiment.

As shown in FIG. 21, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 22A illustrates the configuration of a portion of the magnetic recording device and is an enlarged perspective view of a head stack assembly 160.

FIG. 22B is a perspective view illustrating a magnetic head assembly (head gimbal assembly (HGA)) 158 that is a portion of the head stack assembly 160.

As shown in FIG. 22A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 22B, the head gimbal assembly 158 includes the arm 155 extending from the bearing part 157 and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording device 150 according to the embodiment includes a magnetic recording medium, the magnetic head assembly according to the embodiment, and a signal processor that records and reproduces the signals to and from the magnetic recording medium by using a magnetic head provided in the magnetic head assembly.

The embodiments may include the following configurations (e.g., technological proposals).

Configuration 1

A magnetic recording device, comprising:
a magnetic head including
a magnetic pole,
a first shield,
a conductive member electrically connecting the magnetic pole and the first shield and being provided between the magnetic pole and the first shield, and
a coil;
a first electrical circuit configured to supply a first current to the magnetic pole, the conductive member, and the first shield; and
a second electrical circuit configured to supply a recording current to the coil,
a recording magnetic field being generated from the magnetic pole, the recording magnetic field corresponding to the recording current, a rise time of the recording current being not less than 65% of a shortest bit length.

Configuration 2

The magnetic recording device according to Configuration 1, wherein
the conductive member includes:
a magnetic layer;
a first conductive layer contacting the magnetic pole and the magnetic layer, being provided between the magnetic pole and the magnetic layer, including one of a first material or a second material, and being nonmagnetic; and
a second conductive layer contacting the magnetic layer and the first shield, being provided between the magnetic layer and the first shield, including the other of the first material or the second material, and being nonmagnetic,
the first material includes at least one selected from the group consisting of Ta, Pt, W, Ru, Mo, Ir, Rh, and Pd, and the second material includes at least one selected from the group consisting of Cu, Ag, and Au.

Configuration 3

The magnetic recording device according to Configuration 2, wherein
the first conductive layer includes the first material,
the second conductive layer includes the second material, and
the first current has an orientation from the first shield toward the magnetic pole.

Configuration 4

The magnetic recording device according to Configuration 2, wherein
the first conductive layer includes the second material,
the second conductive layer includes the first material, and
the first current has an orientation from the magnetic pole toward the first shield.

Configuration 5

The magnetic recording device according to Configuration 1, wherein
the conductive member includes:
a first magnetic layer;
a second magnetic layer; and
an intermediate layer provided between the first magnetic layer and the second magnetic layer, the intermediate layer being nonmagnetic.

Configuration 6

The magnetic recording device according to Configuration 5, wherein a high frequency magnetic field is generated from the conductive member.

Configuration 7

The magnetic recording device according to Configuration 5 or 6, wherein
the first magnetic layer includes one of the first magnetic material or the second magnetic material,
the second magnetic layer includes the other of the first magnetic material or the second magnetic material,
the first magnetic material includes at least one selected from the group consisting of an FeCo alloy and a Heusler alloy, and
the second magnetic material includes at least one selected from the group consisting of a stacked film including a CoPt alloy, an FePt alloy, Co, and Pd and a stacked film including Co and Pt.

Configuration 8

The magnetic recording device according to Configuration 7, wherein
the first magnetic layer includes the first material,
the second magnetic layer includes the second material, and
the first current has an orientation from the second magnetic layer toward the first magnetic layer.

Configuration 9

The magnetic recording device according to any one of Configurations 5 to 8, wherein the intermediate layer includes at least one selected from the group consisting of Cu, Au, and Ag.

Configuration 10

A magnetic recording device, comprising:
a magnetic head including
a magnetic pole,
a first shield,
a conductive member electrically connecting the magnetic pole and the first shield and being provided between the magnetic pole and the first shield, and
a coil;
a first electrical circuit configured to perform at least a first operation and a second operation, the first operation supplying a first current to the magnetic pole, the conductive member, and the first shield, the second operation not supplying the first current to the magnetic pole, the conductive member, and the first shield; and
a second electrical circuit configured to supply a recording current to the coil,
a recording magnetic field being generated from the magnetic pole,
the recording magnetic field corresponding to the recording current.

Configuration 11

The magnetic recording device according to Configuration 10, wherein the second electrical circuit sets a first rise time of the recording current in the first operation to be longer than a second rise time of the recording current in the second operation.

Configuration 12

The magnetic recording device according to Configuration 11, wherein a difference between the first rise time and the second rise time is 80 picoseconds or more.

Configuration 13

The magnetic recording device according to any one of Configurations 10 to 12, wherein a rise time of the recording current in the first operation is not less than 65% of a time of 1 bit Configuration 14

The magnetic recording device according to any one of Configurations 10 to 13, wherein
in the second operation, a current does not flow in the magnetic pole, the conductive member, and the first shield, or
in the second operation, a current flowing in the magnetic pole, the conductive member, and the first shield is smaller than the first current.

Configuration 15

The magnetic recording device according to any one of Configurations 10 to 14, wherein
the conductive member includes:
a magnetic layer;
a first conductive layer contacting the magnetic pole and the magnetic layer, being provided between the magnetic pole and the magnetic layer, including one of a first material or a second material, and being nonmagnetic; and
a second conductive layer contacting the magnetic layer and the first shield, being provided between the magnetic layer and the first shield, including the other of the first material or the second material, and being nonmagnetic,
the first material includes at least one selected from the group consisting of Ta, Pt, W, Ru, Mo, Ir, Rh, and Pd, and
the second material includes at least one selected from the group consisting of Cu, Ag, and Au.

Configuration 16

The magnetic recording device according to any one of Configurations 10 to 14, wherein
the conductive member includes:
a first magnetic layer;
a second magnetic layer; and
an intermediate layer provided between the first magnetic layer and the second magnetic layer, the intermediate layer being nonmagnetic, and
a high frequency magnetic field is generated from the conductive member in the first operation.

Configuration 17

The magnetic recording device according to any one of Configurations 1 to 16, further comprising a magnetic recording medium, information being recorded in the magnetic recording medium by the magnetic head.

According to the embodiments, a magnetic head and a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, second shields, stacked bodies, magnetic layers, conductive layers, interconnects, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
    a magnetic head including
        a magnetic pole,
        a first shield,
        a conductive member electrically connecting the magnetic pole and the first shield and being provided between the magnetic pole and the first shield, and
        a coil;
    a first electrical circuit configured to perform at least a first operation and a second operation, the first operation supplying a first current to the magnetic pole, the conductive member, and the first shield, the second operation not supplying the first current to the magnetic pole, the conductive member, and the first shield; and
    a second electrical circuit configured to supply a recording current to the coil,
    a recording magnetic field being generated from the magnetic pole,
    the recording magnetic field corresponding to the recording current,
    wherein the second electrical circuit sets a first rise time of the recording current in the first operation to be longer than a second rise time of the recording current in the second operation.

2. The device according to claim 1, wherein a difference between the first rise time and the second rise time is 80 picoseconds or more.

3. The device according to claim 1, wherein a rise time of the recording current in the first operation is not less than 65% of a time of 1 bit.

4. The device according to claim 1, wherein
    in the second operation, a current does not flow in the magnetic pole, the conductive member, and the first shield, or
    in the second operation, a current flowing in the magnetic pole, the conductive member, and the first shield is smaller than the first current.

5. The device according to 1, wherein
    the conductive member includes:
        a magnetic layer;
        a first conductive layer contacting the magnetic pole and the magnetic layer, being provided between the magnetic pole and the magnetic layer, including one of a first material or a second material, and being nonmagnetic; and
        a second conductive layer contacting the magnetic layer and the first shield, being provided between the magnetic layer and the first shield, including the other of the first material or the second material, and being nonmagnetic, the first material includes at least one selected from the group consisting of Ta, Pt, W, Ru, Mo, Ir, Rh, and Pd, and
    the second material includes at least one selected from the group consisting of Cu, Ag, and Au.

6. The device according to claim 1, wherein
    the conductive member includes:
        a first magnetic layer;
        a second magnetic layer; and
        an intermediate layer provided between the first magnetic layer and the second magnetic layer, the intermediate layer being nonmagnetic, and
    a high frequency magnetic field is generated from the conductive member in the first operation.

7. The device according to claim 1, further comprising a magnetic recording medium, information being recorded in the magnetic recording medium by the magnetic head.

8. The device according to claim 1, wherein
    the conductive member includes:
        a first magnetic layer;
        a second magnetic layer; and
        an intermediate layer provided between the first magnetic layer and the second magnetic layer, the intermediate layer being nonmagnetic.

9. The device according to claim 8, wherein a high frequency magnetic field is generated from the conductive member.

10. The device according to claim 8, wherein the intermediate layer includes at least one selected from the group consisting of Cu, Au, and Ag.

11. The device according to claim 8, wherein
    the first magnetic layer includes one of a first magnetic material or a second magnetic material,
    the second magnetic layer includes the other of the first magnetic material or the second magnetic material, the first magnetic material includes at least one selected from the group consisting of an FeCo alloy and a Heusler alloy, and the second magnetic material includes at least one selected from the group consisting of a stacked film including a CoPt alloy, an FePt alloy, Co, and Pd and a stacked film including Co and Pt.

12. The device according to claim 11, wherein the first magnetic layer includes the first magnetic material, the second magnetic layer includes the second magnetic material, and the first current has an orientation from the second magnetic layer toward the first magnetic layer.

\* \* \* \* \*